(12) United States Patent
Heber et al.

(10) Patent No.: US 12,411,378 B2
(45) Date of Patent: Sep. 9, 2025

(54) SWITCHABLE LIGHT FILTER, LIGHTING DEVICE AND SCREEN

(71) Applicant: siOPTICA GmbH, Jena (DE)

(72) Inventors: André Heber, Jena (DE); Markus Klippstein, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 18/594,894

(22) Filed: Mar. 4, 2024

(65) Prior Publication Data

US 2024/0353706 A1  Oct. 24, 2024

(30) Foreign Application Priority Data

Apr. 21, 2023 (DE) ...................... 10 2023 110 269.9

(51) Int. Cl.
*G02F 1/1335* (2006.01)
*G02F 1/13357* (2006.01)
*G02F 1/1337* (2006.01)

(52) U.S. Cl.
CPC .. *G02F 1/133514* (2013.01); *G02F 1/133606* (2013.01); *G02F 1/133626* (2021.01); *G02F 1/133769* (2021.01)

(58) Field of Classification Search
CPC ...... G02F 1/172; G02F 1/216; G02F 1/13306; G02F 1/133; G02F 2202/01; G02F 1/133509; G02F 1/133606; G02F 1/133626; G02F 1/133773; G02F 1/133769; G02F 1/133514
See application file for complete search history.

(56) References Cited

U.S. PATENT DOCUMENTS

| | | | |
|---|---|---|---|
| 5,993,940 A | 11/1999 | Ouderkirk |
| 6,765,550 B2 | 7/2004 | Janick |
| 8,988,643 B2 | 3/2015 | Yang et al. |
| 9,229,253 B2 | 1/2016 | Schwartz et al. |
| 9,229,261 B2 | 1/2016 | Schwartz et al. |
| 9,459,472 B2 | 10/2016 | Kim et al. |
| 9,481,658 B2 | 11/2016 | Hamasaki et al. |
| 9,881,531 B2 | 1/2018 | Klippstein et al. |

(Continued)

FOREIGN PATENT DOCUMENTS

| | | |
|---|---|---|
| CN | 103091883 B | 11/2015 |
| CN | 111448486 A | 7/2020 |

(Continued)

*Primary Examiner* — Ricky L Mack
*Assistant Examiner* — Journey F Sumlar
(74) *Attorney, Agent, or Firm* — Norris McLaughlin, PA

(57) ABSTRACT

The invention relates to a switchable light filter (5), comprising a first optical element (1), in turn comprising a plurality of light-absorbing transition dipole moments, so that light, which is incident into the first optical element (1), is transmitted or at least partially absorbed as a function of its direction of incidence with respect to the first optical element (1) and its polarization state, means for optionally generating a first electric field (EF1) or a second electric field (EF2), a liquid crystal layer (3), onto which the first electric field (EF1) or the second electric field (EF2) acts, so that the transmission properties of the switchable light filter (5) differ between a first operating mode B1. The invention further discloses lighting devices and screen, which use an afore-described switchable light filter (5).

7 Claims, 8 Drawing Sheets

(56) References Cited

U.S. PATENT DOCUMENTS

| | | |
|---|---|---|
| 10,126,575 B1 | 11/2018 | Robinson et al. |
| 10,303,030 B2 | 5/2019 | Robinson et al. |
| 10,551,648 B2 | 2/2020 | Jeon et al. |
| 10,627,670 B2 | 4/2020 | Robinson et al. |
| 10,649,248 B1 | 5/2020 | Fanjiang et al. |
| 10,670,921 B2 | 6/2020 | Yanai |
| 10,712,608 B2 | 7/2020 | Robinson et al. |
| 10,782,545 B2 | 9/2020 | Smith et al. |
| 10,788,710 B2 | 9/2020 | Robinson et al. |
| 10,802,356 B2 | 10/2020 | Harrold et al. |
| 10,816,711 B2 | 10/2020 | Yanai |
| 10,871,666 B2 | 12/2020 | Saitoh et al. |
| 10,921,622 B2 | 2/2021 | Chen et al. |
| 10,935,714 B2 | 3/2021 | Woodgate et al. |
| 10,948,648 B2 | 3/2021 | Ihas et al. |
| 10,955,715 B2 | 3/2021 | Woodgate et al. |
| 10,976,578 B2 | 4/2021 | Robinson et al. |
| 11,016,318 B2 | 5/2021 | Robinson et al. |
| 11,070,791 B2 | 7/2021 | Woodgate et al. |
| 11,073,735 B2 | 7/2021 | Harrold et al. |
| 11,079,645 B2 | 8/2021 | Harrold et al. |
| 11,092,851 B2 | 8/2021 | Robinson et al. |
| 11,099,433 B2 | 8/2021 | Robinson et al. |
| 11,109,014 B2 | 8/2021 | Robinson et al. |
| 11,115,647 B2 | 9/2021 | Woodgate et al. |
| 11,181,780 B2 | 11/2021 | Robinson et al. |
| 11,187,945 B2 | 11/2021 | Harrold et al. |
| 2010/0092784 A1 | 4/2010 | Kamada et al. |
| 2012/0235891 A1 | 9/2012 | Nishitani et al. |
| 2013/0162924 A1 | 6/2013 | Sahouani et al. |
| 2013/0308185 A1 | 11/2013 | Robinson et al. |
| 2014/0063386 A1 | 3/2014 | Yang et al. |
| 2015/0260652 A1* | 9/2015 | Verstegen ........... G02F 1/13306 356/311 |
| 2015/0378068 A1 | 12/2015 | Hatanaka |
| 2016/0274417 A1* | 9/2016 | Kim ................. G02F 1/133711 |
| 2017/0069236 A1 | 3/2017 | Klippstein et al. |
| 2018/0265707 A1 | 9/2018 | Mizumura et al. |
| 2019/0064557 A1 | 2/2019 | Yanai |
| 2019/0094626 A1 | 3/2019 | Yanai |
| 2019/0317349 A1* | 10/2019 | Kamura ............... G09G 3/3688 |
| 2020/0026114 A1 | 1/2020 | Harrold et al. |
| 2020/0142234 A1 | 5/2020 | Iwasaki et al. |
| 2020/0292878 A1 | 9/2020 | Sekiguchi et al. |
| 2020/0404139 A1 | 12/2020 | Masuda et al. |
| 2021/0096412 A1 | 4/2021 | Iwasaki et al. |
| 2021/0109270 A1 | 4/2021 | Hoshino et al. |
| 2021/0150995 A1* | 5/2021 | Heber ...................... G09G 5/10 |
| 2021/0286204 A1* | 9/2021 | Hoffmann ........... G02F 1/13439 |
| 2023/0037017 A1 | 2/2023 | Yamada et al. |
| 2023/0053738 A1* | 2/2023 | Heber ................... G02F 1/0136 |

FOREIGN PATENT DOCUMENTS

| | | |
|---|---|---|
| CN | 112334797 A | 2/2021 |
| DE | 102019218286 A1 | 5/2021 |
| DE | 10 2020 006110 B3 | 9/2021 |
| JP | 11101964 A | 4/1999 |
| JP | 2005128212 A | 5/2005 |
| JP | 2008165201 A | 7/2008 |
| JP | 2008275976 A1 | 11/2008 |
| JP | 2009145776 A | 7/2009 |
| JP | 2009244356 A | 10/2009 |
| JP | 2011237513 A | 11/2011 |
| JP | 5566178 B2 | 8/2014 |
| JP | 6268730 B2 | 1/2018 |
| JP | 2018200387 A | 12/2018 |
| JP | 6596101 B2 | 10/2019 |
| JP | 6641005 B2 | 2/2020 |
| JP | 6719552 B2 | 7/2020 |
| JP | 6719558 B2 | 7/2020 |
| JP | 2016027387 A | 7/2020 |
| JP | 2019017483 A | 7/2020 |
| JP | 6794422 B2 | 12/2020 |
| JP | 2019103012 A | 12/2020 |
| JP | 2019111763 A | 2/2021 |
| JP | 2019172437 A | 2/2021 |
| JP | 7047405 B2 | 4/2022 |
| KR | 20180061717 A | 6/2018 |
| KR | 20190070843 A | 6/2019 |
| TW | I485490 B | 5/2015 |
| WO | 2012/033583 A1 | 3/2012 |
| WO | 2015/121398 A1 | 8/2015 |
| WO | 2017/195833 A1 | 11/2017 |
| WO | 2017/199656 A1 | 11/2017 |
| WO | 2017/208617 A1 | 12/2017 |
| WO | 2018/003380 A1 | 1/2018 |
| WO | 2018/164252 A1 | 9/2018 |
| WO | 2019/017483 A1 | 1/2019 |
| WO | 2019/103012 A1 | 5/2019 |
| WO | 2019/111763 A1 | 6/2019 |
| WO | 2019/131943 A1 | 7/2019 |
| WO | 2019/132018 A1 | 7/2019 |
| WO | 2019/172437 A1 | 9/2019 |
| WO | 2019/189345 A1 | 10/2019 |
| WO | 2020/004106 A1 | 1/2020 |
| WO | 2021/054099 A1 | 3/2021 |
| WO | 2021/060021 A1 | 4/2021 |
| WO | 2021/060424 A1 | 4/2021 |
| WO | 2021/060432 A1 | 4/2021 |
| WO | 2021/060437 A1 | 4/2021 |
| WO | 2021/177308 A1 | 9/2021 |
| WO | 2021/210359 A1 | 10/2021 |

* cited by examiner

SWITCHABLE LIGHT FILTER, LIGHTING DEVICE AND SCREEN

TECHNICAL FIELD OF THE INVENTION

Significant progress has been made in the last few years to widen the viewing angle in LCDs. However, there are often situations, in which this very large field of view of a screen can be disadvantageous. Information, such as bank details or other, personal information and sensitive data, is also becoming increasingly available on mobile devices, such as notebooks and tablet PCs. Accordingly people need control about who is allowed to see this sensitive data; they must be able to select between a wide viewing angle—a public mode—in order to share information on their display with others, e.g., when looking at vacation photos or also for advertising purposes. On the other hand, they require a small viewing angle—in a private mode—when they want to treat image information confidentially.

A similar problem occurs in the vehicle construction. There, the driver must not be distracted by image contents, such as, for instance, digital entertainment programs, when the motor is turned on, while the passenger wants to consume them while driving, however. A screen is thus required, which can switch between the corresponding display modes.

Additional films, which are based on microlouvers, have already been used for mobile displays, in order to reach the visual data protection thereof. However, these films could not be switched or switched over, they always had to be placed by hand first and then removed again. They also have to be transported separately to the display when they are not needed at the moment. A significant disadvantage of the use of such louver films is further connected with the associated light losses.

The U.S. Pat. No. 6,765,550 B2 describes such a visual protection by means of microlouvers. The largest disadvantage here is the mechanical removal or the mechanical attachment of the filter, respectively, as well as the light loss in the protected mode.

The use of a film, which has small strip-shaped prisms, which are evenly arranged on the surface thereof, in order to achieve a private mode, i.e., a limited view mode with a small viewing angle range, is described in the U.S. Pat. No. 5,993,940 A. Development and production are technically quite complex The switchover between free and limited view by means of the control of liquid crystals between so-called "chromonic" layers is created in the WO 2012/033583 A1. A light loss is created thereby and the technical effort is quite high.

The US 2012/0235891 A1 describes a highly complex backlight—a background lighting—in a screen. According to FIGS. 1 and 15, not only several light guides are used there, but also further complex optical elements, such as, for instance, microlens elements 40 and prism structures 50, which transform the light from the rear lighting on the way to the front lighting. The implementation of this is expensive and technically complex and is likewise connected with light loss. According to the variation according to FIG. 17 in the US 2012/0235891 A1, both light sources 4R and 18 produce light with a narrow lighting angle, wherein the light from the rear light source 18 is first converted in a complex manner into light with a large lighting angle. This complex conversion strongly decreases the brightness, as already noted above.

A special light guide, which is formed with steps and which emits light on a large surface in different directions, depending on the direction, from which it is illuminated from a narrow side, is described in the US 2013/0308185 A1. In combination with a transmissive image reproduction device, e.g., an LC display, a screen can thus be created, which can be switched between free and limited view mode. It is disadvantageous thereby, e.g., that the limited visual effect can be created either only for left/right or also for top/bottom, but not for left/right/top/bottom simultaneously, as it is necessary, for instance, for certain payment processes. In addition, a residual light is still visible even in the limited view mode from blocked viewing angles.

The WO 2015/121398 A1 by the applicant describes a screen with two operating modes, in the case of which scattering particles are present in the volume of the corresponding light guide for the switch-over of the operating modes. However, the scattering particles of a polymer selected there generally have the disadvantage that light is decoupled from both large surfaces, wherein about half of the useful light is emitted in the wrong direction, namely towards the background lighting, and cannot be recycled there to a sufficient extent due to the setup. The scattering particles made of polymer, which are distributed in the volume of the light guide, can furthermore possibly lead to scattering effects, in particular in the case of higher concentration, which prevent the visual protection effect in the protected operating mode.

The approach of the technology of the "electric birefringence (EB)" is based on the idea of utilizing the switchable liquid crystals of an additionally applied LC-panel for "filtering" all light beams, which do not exit from the image-forming layer at a certain radiation angle. Disadvantages of this technology is a high additional energy and cost expenditure and the +/−40° sweet spot, which is difficult to change, i.e. the best possible viewing position. The absorption degree of the LC structures is likewise insufficient because the weakening of the light intensity for viewing angles greater than the sweet spot increases again, so that the light intensity for viewing angles of greater than +/−40° is up to 3% of the maximum light intensity.

The above-mentioned methods and arrangements generally have the disadvantage in common that they significantly reduce the brightness of the basic screen and/or require a complex and expensive optical element for the mode switchover and/or reduce the resolution in the freely observable, public mode and/or have visual artefacts in the case of very high-resolution displays.

DESCRIPTION OF THE INVENTION

It is thus the object of the invention to describe light filters comprising an optical element, in the case of which light, which is incident into the optical element, is transmitted or partially or completely absorbed as a function of its direction of incidence and its polarization properties, but not primarily as a function of its position. Due to the light filters, which use the optical element, the transmission of light is to be influenced in an angle-dependent manner, optionally perpendicular with regard to a sitting or standing observer, wherein a switchover between at least two operating states can be made. In particular the transmission behavior for certain directions is to be capable of being switched over thereby.

This object is solved in a first design according to the invention by a light filter, comprising
    a first optical element, in turn comprising
        a plurality of light-absorbing transition dipole moments, which are arranged in a layer with a thickness of at least 0.2 micrometers, wherein the absorbing transition dipole moments are preferably formed by dichroitic dyes, in the case of which the dye mass density is generally more than 1% or more than 10%, respectively, wherein the majority of the transition dipole moments is aligned with a tolerance of maximally 20° (other tolerance values are also possible, for instance 5° or) 10° parallel to a first preferred direction, which can be selected for the first optical element, or fluctuates around it, at least in a first state (in this context, the property "at least in a first state" comprises several options: one the one hand that there can be exactly one state; this is a permanent design. However, the wording also includes explicitly that there can be two or more states. In this case, the transition dipole moments are changeable, e.g. via so-called guest-host liquid crystal cells), wherein the first preferred direction is arranged at an angle $\alpha$ to the perpendicular bisector of the first optical element, e.g. at $\alpha=0°$, $\alpha=+/-2°$ or amount $(\alpha)>2°$, wherein the angle $\alpha$ is measured in a selectable first plane, which contains said perpendicular bisector, and wherein the angle $\alpha$ is preferably measured parallel to an edge of the first optical element, for instance the lower edge, so that light, which is incident into the first optical element, is transmitted or at least partially absorbed as a function of its direction of incidence with respect to the first optical element and its polarization state, means for optionally generating a first electric field EF1 or a second electric field EF2, a liquid crystal layer, which is arranged behind or in front of the first optical element in the viewing direction and onto which the first electric field EF1 or the second electric field EF2 acts and which, as a function thereof, influences the polarization state of light passing through it, when the liquid crystal layer is arranged in front of the first optical element in the viewing direction, a first linear polarization filter (X), which lies in front of the liquid crystal layer in the viewing direction, the preferred polarization transmission direction of which is preferably aligned parallel to an edge of the first optical element, preferably of the lower edge, so that the transmission properties of the switchable light filter differ between a first operating mode B1, in which the first electric field EF1 is applied (e.g. with the field strength 0 V/μm), and a second operating mode B2, in which the second electric field EF2 is applied (e.g. with a field strength not equal to 0 V/μm, for instance in the magnitude of 1 V/μm, e.g. as square wave with 10 kHz), wherein the respective relative transmission in the two operating modes B1 and B2 at at least one point on the first optical element (preferably at several points, particularly advantageously at at least half of the surface of the optical element) except for a selectable tolerance of, e.g., 3% or 5%, is in each case described by a transmission $T_{B1}(\beta)$ for the operating mode B1 or $T_{B2}(\beta)$ for the operating mode B2, respectively, which are each standardized so that the following applies for the values of the transmission $T_{B1}(\alpha)=1$ and $T_{B2}(\alpha)=1$, in that, when light.

is incident into the first optical element 1 at angles $\beta$ with $\alpha-60°\leq\beta\leq\alpha-40°$ or $\alpha+40°\leq\beta\leq\alpha+60°$, in a first operating mode B1, in which the first electric field EF1 is applied, the s-polarized proportion of said light is transmitted to at least a standardized transmission value $T_{B1}(\beta)\geq0.25$, preferably $T_{B1}(\beta)\geq0.3$, as well as is incident into the first optical element at angles $\beta$ with $\alpha-60°\leq\beta\leq\alpha-40°$ or $\alpha+40°\leq\beta\leq\alpha+60°$, in a second operating mode B2, in which the second electric field EF2 is applied, the p-polarized proportion of said light is transmitted to at a standardized transmission value $T_{B2}(\beta)\leq0.2$, preferably $T_{B2}(\beta)\leq0.1$, particularly preferably $T_{B2}(\beta)\leq0.05$, and advantageously also for all angles $\beta\leq\alpha-40°$ or $\alpha+40°\leq\beta$).

An important means-effect connection exists thereby in the following facts: by switching over between the first operating mode B1, in which the first electric field EF1 is applied (e.g. with the field strength 0 V/μm), and the second operating mode B2, in which the second electric field EF2 is applied (e.g. with a field strength not equal to 0 V/μm, for instance in the magnitude of 1 V/μm, e.g. as square wave with 10 kHz), s-polarized light incident onto the liquid crystal layer only in the operating mode B2 is converted essentially into p-polarized light, which is then incident onto the first optical element, and vice versa. In combination with the layer of the first optical element with a thickness of at least 0.2 micrometers with the absorbing transition dipole moments, the mentioned transmission variations result for $T_{B1}(\beta)$ or $T_{B2}(\beta)$, respectively, of the mentioned operating modes. When the absorbing transition dipole moments are further formed by dichroitic dyes, in the case of which the dye mass density is generally more than 1%, this is a supportive factor.

The means for the selective creation of at least a first electrical field EF1 or a second electrical field EF2 may comprise two or transparent ITO (indium tin oxide as known in the art) layers, between which the liquid crystal layer 3 is arranged. Such ITO layers may be connected to signal generator that applies, as needed for the first electrical field EF1 or the second electrical field EF2, a DC or, preferably AC, electrical signal, for instance a sinusoidal or rectangular (or other) electrical signal. Thus, the ITO layers will then exhibit the respective first electrical field EF1 or second electrical field EF2 that influences that state of the liquid crystals of the liquid crystal layer 3. In an exemplary embodiment, the signal used for the first mode B1 is rectangular or sinusoidal with a frequency of 1 kHz to 10 kHz, and the maximum voltages applied range from −20V to +20V. In second mode, the second electrical field EF2 may have a field intensity of 0 V/m, i.e. it may be field-free. Alternatively, the association of the field-free state may be for the first mode B1 and the second mode B2 presents a non-field-free state.

Other embodiments are possible, for instance using the same principles that are used in FFS (fringe filed switching) or IPS (in plane switching) LCD panels to drive their pixels. However, the invention is not limited to the aforementioned embodiments and only gives possible examples of exemplary execution of the invention.

Furthermore, said means for the selective creation of at least a first electrical field EF1 or a second electrical field EF2 may be embodied such that they create the first electrical field EF1 and the second electrical field EF2 at the same time, however on different locations of the switchable light filter 5 to thereby allow partial switching of the switchable light filter 5 to different modes.

Also, said means for the selective creation of at least a first electrical field EF1 or a second electrical field EF2 may be embodied by those skilled in the art such that they create not only a first electrical field EF1 and a second electrical field EF2, but also, as may be needed, further third, fourth etc. electrical field EF3, EF4 etc. to allow additional modes of operation for the full are of the switchable light filter 5, or just partially.

Further operating modes B3, B4, etc. with electric fields EF3, EF4, etc., which deviate from the electric fields EF1 and EF2, can explicitly also be provided. The operating modes B1, B2, etc. can additionally also differ locally on the switchable light filter.

To standardize the transmission $T_{B1}(\alpha)=1$ and $T_{B2}(\alpha)=1$, the following is to be mentioned: the angles $\beta$ and $\alpha$ are obviously measured in the same fore-described plane. It is generally also possible that $T_{B1}(\alpha)>1$ and/or $T_{B2}(\alpha)>1$ applies for angle $\beta\neq\alpha$. In many cases, what applies, in turn, is $T_{B1}(\alpha)<1$ and/or $T_{B2}(\alpha)<1$ applies for angles $\beta\neq\alpha$.

In the event that the transition dipole moments are changeable, e.g., via so-called guest-host liquid crystal cells, such guest-host liquid crystal cells can, but do not have to, correspond directly to the above-mentioned liquid crystal layer.

In a preferred design, light penetrating the liquid crystal layer is transmitted essentially in an unchanged manner when the first electric field EF1 is applied, while the incident light is polarized in a circular or elliptical manner or the polarization of the light is rotated by 90° when the second electric field EF2 is applied. In this context, it essentially means that the orientation of the liquid crystal molecules at the boundary surfaces is determined by means of electric fields and surface-induced forces, so that the liquid crystal molecules are not aligned ideally, which leads to an unwanted, small change of the polarization.

The following applies for designs with TN liquid crystals: the alignment of the liquid crystal molecules typically differs by 90° at the large surfaces, which limit the liquid crystal layer. Such an alignment is supported by PMI or PVA and additionally by mechanical or optical processing of the surface. It generally further applies for TN liquid crystal layers that in response to the switch-over between the electric fields EF1 and EF2, the majority of the liquid crystals in the liquid crystal layer are rotated by 75 to 90 degrees out of the plane. In the case of IPS- and FFS liquid crystal layers, the rotations of the LC molecules are smaller than 45°, typically approximately 20° to 30°.

When the liquid crystal layer is arranged behind the first optical element in the viewing direction, linearly polarized light or elliptically polarized light is preferably incident, in the case of which the ratio of large to small semi-axis is at least 4:1 (preferably at least 5:1 or more). This can be attained, for example, by means of linear polarization filters in the light path or also by means of N/4 layers in the case of the incidence of circularly polarized light.

Advantageously, what applies is that the first optical element (and each further of such optical element, if present) and/or the liquid crystal layer is divided into several, separately switchable segments, so that a local switch-over capability between the respective possible operating states is made possible.

In a further design, the switchable light filter comprises at least two first optical elements, wherein a retarder is optionally arranged between at least two such first optical elements. In addition, the at least two first optical elements can optionally, but do not have to, have different thicknesses of the layers, which each contain the plurality of light-absorbing transition dipole moments.

In certain designs of the invention, it can apply that there is at least one angle $\beta_1$, for which the transmission of the p-polarized proportion of said light is not equal to the transmission of the s-polarized proportion of said light. This condition preferably applies for an entire angular range of angles $\beta_1$, and particularly preferably even for all angles $\alpha+\beta$.

In again other designs of the invention, it can apply that in both operating modes B1 and B2, there is at least one angle $\beta_2$, for which the transmission of the s-polarized proportion of said light is greater than the transmission of the p-polarized proportion of said light. This condition preferably applies for an entire angular range of angles $\beta_2$, and particularly preferably even for all angles $\alpha\neq\beta$.

The invention also comprises a lighting device in a first design for a screen, which can be operated in at least two operating modes B1 for a free view mode and B2 for a limited view mode, in which light is emitted into a viewing angle range, which is limited for an observer compared to the free view mode, comprising a background lighting extended in a flat manner, which emits light and which is optionally set up so as to shine directly (e.g., with an LED matrix), as well as a switchable light filter according to the invention as described above, which is arranged in front of the background lighting in the viewing direction.

In addition to this, the invention likewise comprises a screen in a first design, which can be operated in at least two operating modes B1 for a free view mode and B2 for a limited view mode, in which light is emitted into a viewing angle range, which is limited for the user compared to the free view mode, comprising a lighting device as described above, as well as, when no first linear polarization filter is arranged in the switchable light filter of the lighting device, a second linear polarization filter P, which is arranged in front of the background lighting in the viewing direction, whereby light, which originates from the background lighting and penetrates the second linear polarization filter P, is limited in its propagation directions, and a transmissive image reproduction device, which is arranged in front of the switchable light filter in the viewing direction, wherein in the operating mode B2 the second electric field Feld EF2 and wherein in the operating mode B1 the first electric field EF1 is applied.

The term background lightning is synonym to synonym to Backlight or Background illumination.

It thereby preferably applies that the first or second linear polarization filter P is arranged in the transmissive image reproduction device or is a part thereof.

The invention further comprises a screen in a second design, which can be operated in at least two operating modes B1 for a free view mode and B2 for a limited view mode, in which light is emitted into a viewing angle range, which is limited for an observer compared to the free view mode, comprising an image reproduction device, wherein any type of image reproduction device is generally possible here, for example LC-panel, OLED, microLED and others, a switchable light filter according to the invention in front of the image reproduction device in the viewing direction as described further above, wherein in the first operating mode B2 the second electric field EF2 is applied and wherein in the operating mode B1 the first electric field EF1 is applied.

It can optionally apply that the switchable light filter is attached subsequently by a user and/or reversibly to the image reproduction device. A light filter can be sold as so-called "after-market product" in this case.

The invention further comprises a screen in a third and a fourth design, which can be operated in at least two operating modes B1 for a free view mode and B2 for a limited view mode, in which light is emitted into a viewing angle range, which is limited for an observer compared to the free view mode, comprising a transmissive image reproduction device, preferably an LC-panel, a background lighting arranged downstream from the transmissive image reproduction device in the viewing direction, wherein said background lighting has a light density distribution, the peak brightness of which is emitted in a direction, which forms an angle of at least 3° with the first preferred direction, advantageously even 5° or 8°, (the background lighting can have a permanent or variable light density curve), a switchable light filter according to the invention as described further above in front of (third design) or behind (fourth design) the image reproduction device in the viewing direction, wherein in the operating mode B2 the second electric field EF2 and wherein in the operating mode B1 the first electric field EF1 is applied.

A background lighting with such properties can be generated, for example, when it also contains a turning film and/or a partially mirrored or an asymmetrical prism grid above a light guide with diffuser, BEF or DBEF, respectively.

For such a screen of the third or fourth design, it can furthermore advantageously apply, for at least one partial surface, that in the second operating mode B2 it applies for an angular range of at least $\alpha-4° \leq \beta \leq \alpha+4°$ (preferably even for $\alpha-6° \leq \beta \leq \alpha+6°$ or $\alpha-8° \leq \beta > \alpha+8°$, to maximally $\alpha-20° \leq \beta \leq \alpha+20°$, for all angles $\beta$ contained in said angular range that the product of $T_{B2}(\beta)$, light density $L_V(\beta)$ of the background lighting at the angle $\beta$ as well as transmission $T_{BW}(\beta)$ of the image reproduction device at the angle $\beta$ deviates maximally by +/−10% from the value for said product for the angle $\alpha=\beta$.

Due to the compliance of this product—as part of the mentioned tolerance—the perceived homogeneity is increased for an observer because, for instance in the case of strong transmission decrease of the first optical element or of the image reproduction device, respectively, when an oblique view is present, for instance on lateral regions of the screen, when the observer looks centrally frontally onto the screen, is compensated again due to the correcting light density distribution of the background lighting.

Alternatively, it can optionally apply for such a screen of the third or fourth design, for at least one partial surface, that in the second operating mode B2 for an angular range of at least $\alpha-4° \leq \beta \leq \alpha+4°$ (preferably even for $\alpha-6° \leq \beta \leq \alpha+6°$ or $\alpha-8° \leq \beta \leq \alpha+8°$, to maximally $\alpha-20° \leq \beta \leq \alpha+20°$ for all angles $\beta$ contained in said angular range that the product of $T_{B2}(\beta)$ and light density $L_V(\beta)$ of the background lighting at the angle $\beta$ deviates maximally by +/−10% from the value for said product for the angle $\alpha=B$.

The above-described balancing effect also applies here due to the disruptive light density distribution of the background lighting, but by disregarding the transmission behavior of the image reproduction device.

Finally, the invention also comprises a screen in a fifth design, wherein the screen can be operated in at least two operating modes B1 for a free view mode and B2 for a limited view mode, in which light is emitted into an angular range, which is limited for an observer compared to the free view mode, comprising a transmissive image reproduction device, preferably an LC-panel, a background lighting arranged downstream from the transmissive image reproduction device in the viewing direction, wherein said background lighting has an asymmetrical light density distribution, wherein said asymmetry is preferably present with respect to the horizontal direction from the point of view of an observer, a switchable light filter according to the invention, as described further above, in front of or behind the image reproduction device in the viewing direction, wherein in the operating mode B2 the second electric field EF2 and wherein in the operating mode B1 the first electric field EF1 is applied.

The background lighting is thereby designed so that it essentially does not have any symmetrical light density distribution (e.g., around the vertical central line—from the point of view of the observer) but, in contrast, embodies an asymmetrical light density distribution (e.g., in the horizontal). In other words: said background lighting 8a has an asymmetrical light density distribution, wherein said asymmetry is preferably present with respect to the horizontal direction from the point of view of an observer. Such a design is possible, for example, by using light guides, which decouple light in a deterministic manner and/or turning films, which shift the peak brightness.

This variation is advantageous for use cases in vehicles because in particular light, which would be emitted in the direction of the passenger window, can then be decreased significantly by the design of the background lighting, for instance starting at horizontal angles of 25 degrees or more (compared to the perpendicular bisector), for example to less than 10%, preferably to less than 2.5%, of the peak brightness, while an intentionally high light density is present in the direction of the driver. Disturbing reflections in the passenger window or optionally on the outside mirror closest to the passenger are reduced or even avoided in this way. Due to the light filter attached in front of the image reproduction device, the screen can nonetheless optionally be operated so that either only the passenger can see image contents (operating mode B2), for instance for moving images, or that driver as well as passenger can see image contents (operating mode B1), for instance for navigation map material.

For some above-described screens of the first to fourth design, it can be advantageous when being used in a passenger car when in the viewing direction in front of the transmissive image reproduction device, a second optical element is arranged, which comprises:

a plurality of light-absorbing transition dipole moments; the dye mass density is thereby greater than 1% or even greater than 10%, respectively.

wherein the majority of the transition dipole moments at least in a first state with a tolerance of maximally 20° (alternatively) 10° is aligned parallel to a second preferred direction, which can be selected for the second optical element, or fluctuates around it, wherein the second preferred direction is arranged at an angle $\alpha_1$ to the perpendicular bisector of the second optical element (the following can apply thereby, for example, $\alpha_1=0°$, $\alpha_1=+/−2°$ or amount $(\alpha_1)>2°$, wherein the angle $\alpha_1$ is measured in a selectable second plane, which contains said perpendicular bisector; the second plane preferably lies perpendicular to the first plane of the first optical element, so that light, which is incident into the second optical element, is transmitted or at least partially absorbed as a function of its direction of incidence with respect to the second optical element and its polarization state.

This last-mentioned design advantageously ensures a reduced transmission in the vertical direction and can thus reduce or completely avoid reflections in the vehicle of image contents displayed on said screen on the windshield.

The invention further comprises a lighting device for a screen in a second design, which can be operated in at least two operating modes B1 for a free view mode and B2 for a limited view mode, in which light is emitted into an angular range, which is limited compared to the free view mode, comprising a background lighting extended in a flat manner, which emits light into a limited angular range and which is set up so as to optionally shine directly, as well as a plate-shaped light guide, which is located in front of the background lighting in the viewing direction, which has decoupling elements on at least one of the large surfaces and/or within its volume, lighting means arranged laterally on at least one narrow side of the light guide, and optionally a linear polarization filter, a switchable light filter according to the invention as described further above, which is arranged in front of the background lighting in the viewing direction (this also includes a position in front of a screen, with which the lighting device is used), wherein in the operating mode B2, the background lighting is turned off and the lighting means are turned on, and wherein in the operating mode B1 at least the lighting means are turned on, and wherein in the operating mode B2 the second electric field EF2 and wherein in the operating mode B1 the first electric field EF1 is applied.

In the context of the invention and in particular with regard to the background lighting, "limited angular range" means that the corresponding light density is concentrated in a defined angular range at at least 80% or 90%, while there can in fact also still be residual light outside of the defined limited angular range, which generally has a technical reason. Ideally, such residual light is minimal and decreases towards larger angles. To attain a particularly strong minimization, a corresponding light filter is used in addition to the background lighting, which emits light into a limited angular range. This also applies for the below-described variation with a light guide, which emits or decouples light, respectively, mostly into a limited angular range. In contrast to this design of the invention, light density curves of background lighting are typically bell-shaped over in particular horizontal (optionally also vertical) angular ranges, wherein, however, no real concentration of the light density by a smaller angular range has to be present.

Lastly, the invention comprises a lighting device for a screen in a third design, which can be operated in at least two operating modes B1 for a free view mode and B2 for a limited view mode, in which light is emitted into an angular range, which is limited compared to the free view mode, a background lighting extended in a flat manner, which emits light into a non-limited angular range and which is set up so as to optionally shine directly (e.g., by means of a locally dimmable LED matrix lighting unit), as well as a plate-shaped light guide, which is located in front of the background lighting in the viewing direction, which has decoupling elements on at least one of the large surfaces and/or within its volume, wherein said decoupling elements mostly decouple light, which is coupled in laterally in at least one narrow side of the light guide (i.e., more than half, preferably more than 80% or 90%) into a limited angular range, lighting means arranged laterally on at least one narrow side of the light guide, and optionally a linear polarization filter, a switchable light filter according to the invention as described above, which is arranged in front of the background lighting in the viewing direction, wherein in the operating mode B2, the background lighting is turned off and the lighting means are turned on, and wherein in the operating mode B1, at least the background lighting is turned on (the lighting means can optionally also be turned on), and wherein in the operating mode B2 the second electric field EF2 and wherein in the operating mode B1 the first electric field EF1 is applied.

The lighting devices of the first, second and third designs are advantageously combined with a transmissive screen, for instance an LC-panel, in order to create a screen, which can be operated in at least two operating modes B1 for a free view mode and B2 for a limited view mode, in which light is emitted into an angular range, which is limited compared to the free view mode.

It applies advantageously that the transition dipole moments of a first optical element (or optionally, if present, also of a second or further optical element) are formed as one or several dichroitic dye(s), which are mixed with the liquid crystals in a guest-host arrangement. For permanent transition dipole moments, the liquid crystals can preferably be fixed via a hardening process.

In contrast, the transition dipole moments can also be embedded in a non-fixed manner as guest-host arrangement into a liquid crystal layer, so that the transition dipole moments can be varied in their alignment and/or their amount between the first and at least one second state, depending on the influence of this liquid crystal layer.

The dichroitic dye molecules are generally aligned parallel to the liquid crystal molecules.

Alternatively, the first optical element can be formed as laminate of layers of polymer film polarizers.

By means of the above-mentioned designs, it is additionally ensured that the first optical element is set up non-periodically in its structure. This is highly advantageous because in combination with pixel structures of screens, there is no risk for artefacts, such as Moiré effects.

The first preferred direction can in each case draw an angle of, for example, between 0° and 45° to a surface normal of the first optical element. In addition, it is possible that the first preferred direction varies over the surface of the first optical element. In terms of the invention, the average, weighted preferred direction then applies.

It is further possible that at least two such preferred directions in a selectable plane differ by more than 10° and/or that the respective preferred direction of a transition dipole moment can be selected as a function of the position thereof in the first optical element.

In addition, it can be advantageous when the first optical element is divided along a selectable reference line into different regions (A1, A2, . . . ), wherein a separate region preferred direction can be selected for each region (A1, A2, . . . ), which applies for all transition dipole moments lying within a region (A1, A2, . . . ), wherein all region preferred directions are different in pairs and, except for a tolerance of maximally +/−10 degrees, point in a direction of an observer 3. This arrangement has the advantage that the observer perceives a screen with a light filter in the limited view mode as being homogenously illuminated.

The transition dipole moment—also referred to as transition matrix element—is assigned a quantum mechanical vectorGROESSE and a specific transition between an initial state—generally the base state—and an end state—generally an excited state—of a system, i.e., of an atom, molecule or solid body and corresponds to the electrical dipole moment, which is connected to this transition. The direction of the vector defines the polarization of the transition, which, in turn, determines, how the system interacts with an electromagnetic wave, with specified polarization, for example light of the corresponding polarization is absorbed in response to the transition from the base state into the excited state. The amount of the vector corresponds to the intensity of the interaction or to the transition probability, respectively.

The first (second) preferred direction thereby corresponds to that alignment of the transition dipole moments of the first (second) optical element in the case of specified direction of propagation of light, in the case of which the absorption is identical for any polarizations of the light.

The first and second preferred direction can also be identical or can differ in their alignment by only a few degrees (maximally 10°) and both can in particular be perpendicular on the respective optical element. This is a preferred case. Depending on the application, however, it is also possible that the first and second preferred direction differ from one another by more than 10°.

The light filter can furthermore comprise a polarization filter, which is arranged in front of or behind the first or the second optical element in the direction of incidence. Alternatively or additionally, a N/4 layer is also conceivable, for instance in response to the incidence of circularly polarized light, which is converted into (essentially) linearly polarized light in this layer.

A first exemplary production variation for a first or second optical element by using the guest-host principle is based on mixtures of dichroitic dyes or dichroitic dye mixtures with liquid crystal mixtures or compounds, and comprises the following steps for the production (with reference to the U.S. Pat. No. 9,481,658 B2 or WO2021/177308A1, respectively, paragraph 37 et seqq.)

- a weakly refractive or non-birefringent substrate is coated with a film, which determines the alignment of the molecules relative to the surface, generally parallel or perpendicular to the surface. Polymers, preferably polyvinyl alcohol or polyimides are used for this purpose.
- Optionally: optical or mechanical treatment of the surfaces in order to improve the later quality of the molecule alignment.
- Applying the mixture of dichroitic dye and thermotropic liquid-crystalline compounds or polymers.
- Due to the irradiation of light, the side chains are condensed locally, so that they ensure birefringence along the surface.

An alternative, second production variation uses thermotropic, liquid-crystalline dichroitic dyes (reference to the JP2011-237513A), and comprises the following steps:

- production of the corresponding dyes and adding a polar group.
- Applying the dye mixture as well as photo alignment and hardening of the dye mixture by means of polarized light.

The following materials can be used for different production variations, for example, wherein this list does not claim to be complete:

- as polymer substrate with low or no birefringence: preferably TAC,
- as dichroitic substances or mixtures: dichroitic dyes (preferably azo dyes) or dichroitic metal nanoparticles (preferably gold, silver, copper and aluminum); these are generally individual dyes of one or mixtures of typically up to three different dyes in order to provide for the absorption over the entire spectrum,
- for the surface treatment by alignment of dyes or liquid-crystalline substances: polymers, preferably polyvinyl alcohol or polyimides,
- for thermotropic liquid-crystalline compounds or polymers, reference is made in an exemplary manner to the JP 2011-237513A.
- As chemical groups for cross-linking, which are bound to the thermotropic liquid-crystalline compounds or polymers (cross linking): metaacrylol groups, epoxy groups, oxetanyl groups, and styrene groups, preferably methacrolytic groups. Alternatively, they can be polymerizable liquid crystal compounds, which are described, for instance, in the JP 6268730B2.
- Polymerizable liquid-crystalline dichroitic dyes, for example azo dyes The at least one dye consisting of dye molecules, wherein a transition dipole or transition dipole moment, respectively, is advantageously associated for each dye molecule, i.e., each dye molecule corresponds to a transition dipole or transition dipole moment, respectively. A dye typically has a mass fraction of at least 0.01%, preferably of 1% to 15% in the material of the respective layers of the respective optical element. In special cases, the concentration in the case of liquid-crystalline dichroitic dyes can even reach 95%. The thickness of the layers preferably lies in the range of 0.2 μm to 50 μm, preferably in the range of 0.5 μm to 20 μm, all boundary values are in each case included. The dyes or dye mixtures, respectively, for different layers within an optical element can be, but do not have to be, different.

An above-described light filter, a lighting device or such a screen are advantageously used in a mobile device, a motor vehicle, aircraft or watercraft, in a payment terminal or in an access system. A switchover can be made thereby between the mentioned operating modes in order to protect sensitive data, i.e., to display it to be perceivable only for one observer, or alternatively to display image contents simultaneously for several observers.

The performance of the invention is generally maintained when the above-described parameters are varied within certain limits.

It goes without saying that the above-mentioned features and the features, which will be described blow, cannot only be used in the specified combinations, but also in other combinations or alone, without leaving the scope of the present invention.

BRIEF DESCRIPTION OF THE DRAWINGS

The invention will be described in more detail below on the basis of exemplary embodiments with reference to the enclosed drawings, which likewise disclose features, which are essential for the invention. These exemplary embodiments are for illustration purposes only and are not to be interpreted as being limiting. For example, a description of an exemplary embodiment with a plurality of elements or components is not to be interpreted to the effect that all of these elements or components are necessary for the implementation. In contrast, other exemplary embodiments can also contain alternative elements and components, fewer elements or components or additional elements or components. Elements or components of different exemplary embodiments can be combined with one another, unless otherwise stated. Modifications and variations, which are described for one of the exemplary embodiments, can also be applied for other exemplary embodiments. To avoid repetitions, identical or corresponding elements in different figures are identified with identical reference numerals and are not described several times, in which.

DETAILED DESCRIPTION OF THE DRAWINGS

The drawings are not true to scale and only represent schematic diagrams. For exemplary drawings FIGS. 1b, 3, 4, 9c and 10b to 10d, which represent one- or two-dimensional angle-dependent illustrations of the transmission, e.g., of light filters, it applies that the numbers assigned to the lines in each case represent the transmission standardized to "1" in the case of the corresponding angle pair in polar coordinates. For example in the illustration FIG. 1b, the number "0.90" thus corresponds to a transmission of 90% for the corresponding direction.

Figure 1A:
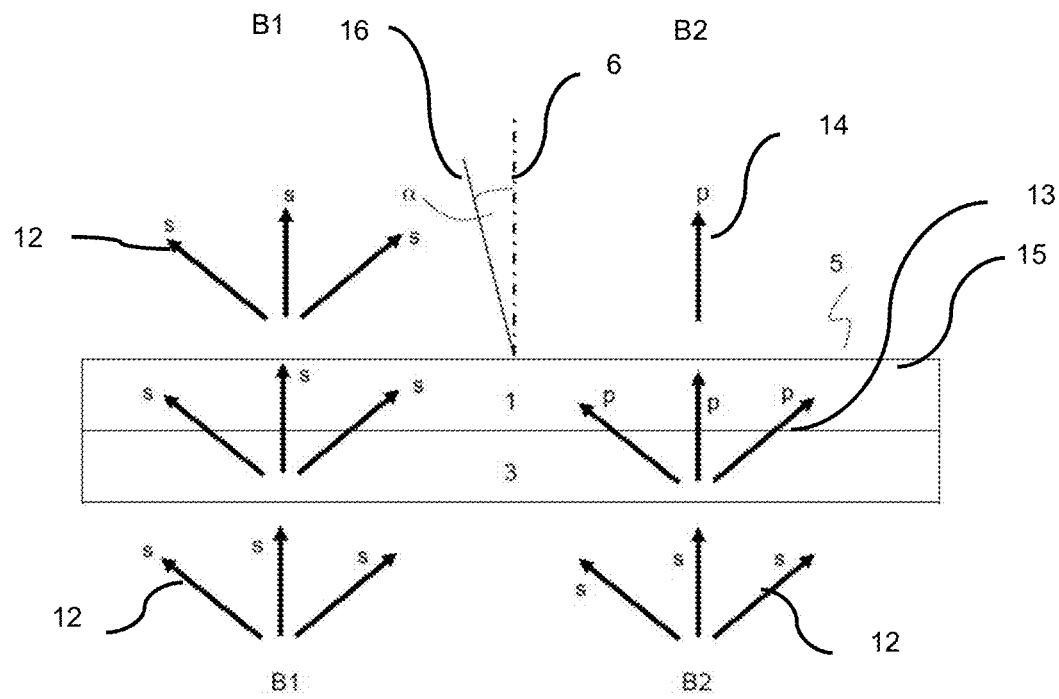
FIG. 1a shows the schematic diagram for the mode of operation of an exemplary switchable light filter in operating modes B1 and B2.

FIG. 1a shows the schematic diagram for the mode of operation of an exemplary switchable light filter 5 in a first operating mode (B1) and a second operating mode (B2). The exemplary light filter 5 comprises a first optical element 1, in turn comprising.
   a plurality of light-absorbing transition dipole moments 15, which are arranged in a layer with a thickness of at least 0.2 micrometers, wherein the absorbing transition dipole moments are preferably formed by dichroitic dyes, in the case of which the dye mass density is more than 1% or more than 10%, respectively,
   wherein the majority of the transition dipole moments 15 is aligned with a tolerance of maximally 20° (other tolerance values are also possible, for instance 5° or 10°) parallel to a first preferred direction, which can be selected for the first optical element 1, or fluctuates around it, at least in a first state (in connection with the design examples, which are described below with on the basis of the drawings, the property "at least in a first state" is to comprise exactly one option, namely that there is exactly one state; that is, this is a permanent design), wherein the first preferred direction is arranged at an angle α to the perpendicular bisector of the first optical element, e.g. at α=0°, α=+/−2° or amount (α)>2°, wherein the angle α is measured in a selectable first plane, which contains said perpendicular bisector, and wherein the angle α is preferably measured parallel to an edge of the first optical element 1, for instance the upper edge,
   so that light, which is incident into the first optical element 1, is transmitted or at least partially absorbed as a function of its direction of incidence with respect to the first optical element 1 and its polarization state,
means (not illustrated graphically, e.g. see para [0068]) for optionally generating a first electric field EF1 or a second electric field EF2,
a liquid crystal layer 3, which is arranged in this example behind the first optical element 1 in the viewing direction and onto which the first electric field EF1 or the second electric field EF2 acts and which, as a function thereof, influences the polarization state of light passing through it,
so that the transmission properties of the switchable light filter 5 differ between a first operating mode B1, in which the first electric field EF1 is applied (e.g. with the field strength 0 V/μm), and a second operating mode B2, in which the second electric field EF2 is applied (e.g. with a field strength not equal to 0 V/μm, for instance in the magnitude of 1 V/μm, e.g. as square wave with 10 kHz), wherein the respective relative transmission in the two operating modes B1 and B2 at at least one point on the optical element 1 (preferably at several points, particularly advantageously at at least half of the surface of the optical element) except for a selectable tolerance of, e.g., 3% or 5%, is in each case described by a transmission $T_{B1}(B$ for the operating mode B1 or $T_{B2}(\beta)$ for the operating mode B2, respectively, which are each standardized, so that the following applies for the values of the transmission $T_{B1}(\alpha)=1$ and $T_{B2}(\alpha)=1$, in that, when light
is incident into the optical element 1 at angles β with $\alpha-60°\leq\beta\leq\alpha-40°$ or $\alpha+40°\leq\beta\leq\alpha+60°$, in a first operating mode B1, in which the first electric field EF1 is applied, the s-polarized proportion of said light is transmitted at least at a standardized transmission value $T_{B1}(\beta)\geq0.25$ (preferably $T_{B1}(3)\geq0.3$), as well as
is incident into the optical element 1 at angles β with $\alpha-60°\leq\beta\leq\alpha-40°$) or $\alpha+40°\leq\beta\leq\alpha+60°$, in a second operating mode B2, in which the second electric field EF2 is applied, the p-polarized proportion of said light is maximally transmitted at a standardized transmission value $T_{B2}(\beta)\leq0.2$ (preferably $T_{B2}(3)$ ≤0.1, particularly preferably $T_{B2}(\beta)\leq0.05$, and advantageously also for all angles $\beta\leq\alpha-40°$ or $\alpha+40°\leq\beta$).

The following is to be mentioned for the standardization of the transmission $T_{B1}(\alpha)=1$ and $T_{B2}(\alpha)=1$: the angles β and ox are obviously measured in the same afore-described plane. It is generally also possible that $T_{B1}(\alpha)>1$ and/or $T_{B2}(\alpha)>1$ applies for angles $\beta\neq\alpha$. In many cases, in turn, the following applies $T_{B1}(\alpha)<1$ and/or $T_{B2}((x)<1$ applies for angle $\beta\neq\alpha$.

The means for the selective creation of at least a first electrical field EF1 or a second electrical field EF2 may comprise two or transparent ITO (indium tin oxide as known in the art) layers, between which the liquid crystal layer 3 is arranged. Such ITO layers may be connected to signal generator that applies, as needed for the first electrical field EF1 or the second electrical field EF2, a DC or, preferably AC, electrical signal, for instance a sinusoidal or rectangular (or other) electrical signal. Thus, the ITO layers will then exhibit the respective first electrical field EF1 or second electrical field EF2 that influences that state of the liquid crystals of the liquid crystal layer 3. In an exemplary embodiment, the signal used for the first mode B1 is rectangular or sinusoidal with a frequency of 1 kHz to 10 kHz, and the maximum voltages applied range from −20V to +20V. In second mode, the second electrical field EF2 may have a field intensity of 0 V/m, i.e. it may be field-free. Alternatively, the association of the field-free state may be for the first mode B1 and the second mode B2 presents a non-field-free state.

Other embodiments are possible, for instance using the same principles that are used in FFS (fringe filed switching) or IPS (in plane switching) LCD panels to drive their pixels. However, the invention is not limited to the aforementioned embodiments and only gives possible examples of exemplary execution of the invention.

Furthermore, said means for the selective creation of at least a first electrical field EF1 or a second electrical field EF2 may be embodied such that they create the first electrical field EF1 and the second electrical field EF2 at the same time, however on different locations of the switchable light filter 5 to thereby allow partial switching of the switchable light filter 5 to different modes.

Also, said means for the selective creation of at least a first electrical field EF1 or a second electrical field EF2 may be embodied by those skilled in the art such that they create not only a first electrical field EF1 and a second electrical field EF2, but also, as may be needed, further third, fourth etc. electrical field EF3, EF4 etc. to allow additional modes of operation for the full are of the switchable light filter 5, or just partially.

An important means-effect connection exists thereby in the following facts: by switching over between the first operating mode B1, in which the first electric field EF1 is applied (e.g. with the field strength 0 V/μm), and the second operating mode B2, in which the second electric field EF2 is applied (e.g. with a field strength not equal to 0 V/μm, for instance in the magnitude of 1 V/μm, e.g. as square wave with 10 kHz), s-polarized light shining onto the liquid crystal layer 3 only in the operating mode B2 is converted essentially into p-polarized light, which is then incident onto the first optical element 1. This is shown in FIG. 1a: the operating mode B1 is shown on the left, the s-polarized light component of the incident light on the liquid crystal layer 3 still remains s-polarized after passing through said liquid crystal layer. In contrast, it is shown on the right side of FIG. 1a, how the s-polarized light component becomes p-polarized light after passing through the liquid crystal layer. In combination with the layer of the first optical element with a thickness of at least 0.2 micrometers with the absorbing transition dipole moments, the mentioned transmission variations result for $T_{B1}(\beta)$ or $T_{B2}(\beta)$, respectively, of the mentioned operating modes. This is suggested by means of the arrows in FIG. 1a: on the left, i.e., in the operating mode B1, the s-polarized light also passes through the first optical element 1 at inclined angles, while on the right, i.e., in the operating mode B2, the p-polarized component is transmitted away to the side, thus illustrated in a stylized manner by means of the arrow only in the perpendicular direction In a preferred design, light penetrating the liquid crystal layer 3 is thus transmitted essentially in an unchanged manner when the first electric field EF1 is applied, while the incident light, while the incident light is polarized in a circular or elliptical manner or the polarization of the light is rotated by 90° when the second electric field EF2 is applied. As described above, FIG. 1 shows the operating mode B1 on the left side. The first electric field E1 is thereby applied, and the light incident from below, which is shown with "s s s", is essentially not changed in its polarization by means of the liquid crystal layer 3. The s-polarized light can accordingly penetrate the optical element 1 with the transition dipole moments, namely (at least) in all directions, which are suggested here in the paper plane. Even through there are losses in the transmission thereby, the above-described condition for the transmission value $T_{B1}(\beta)$ is maintained for the corresponding angles β with $\alpha-60°\leq\beta\leq\alpha-40°$ or $\alpha+40°\leq\beta\leq\alpha+60°$.

For the sake of clarity, the angle α is illustrated in FIG. 1 with a value of greater than 0°. However, $\alpha=0°$ is to generally apply for all considerations. Values of ox #0° provide for the tilting of the preferred transmission direction of the switchable light filter 5.

On the right side, FIG. 1 further shows the operating mode B2. The second electric field E2 is applied thereby, and the light shown with "s s s", which is incident from below, is changed in its polarization by means of the liquid crystal layer 3, namely converted essentially into p-polarized light. The p-polarized light created in this way can accordingly now penetrate the optical element 1 with the transition dipole moments only to a limited extent. Due to the alignment of the transition dipole moments, a limited transmission thereby applied, the above-described condition for the transmission value $T_{B2}(\beta)$ is in particular maintained for the corresponding angles $\beta$ with $\alpha-60°\leq\beta\leq\alpha-40°$ or $\alpha+40°\leq\beta\leq\alpha+60°$. Said condition is preferably even maintained for all angles $\beta\leq\alpha-40°$ or $\alpha+40°\leq\beta$.

Figure 1B:
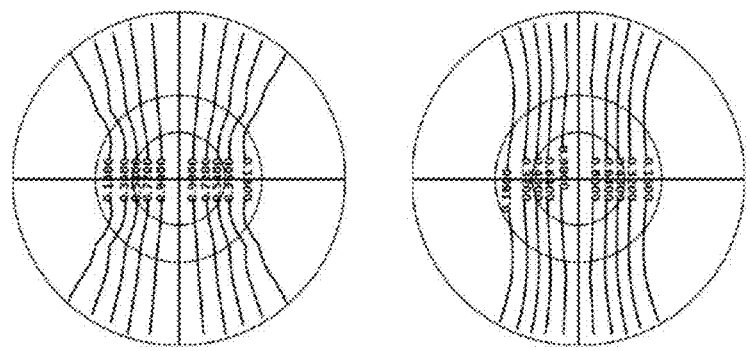
FIG. 1b shows exemplary standardized transmission graphs for an optical element in combination with a linear polarization filter, on the left without and on the right with waveplate (B-plate)

To further understand the mode of operation of the invention, FIG. 1b furthermore shows exemplary standardized transmission graphs for an optical element 1 in combination with a linear polarization filter, on the left without and on the right with waveplate (B-plate). It can be seen that the use of a waveplate (retarder, e.g., B-plate as calculated here) ensures a decreased transmission and is thus advantageous in particular for vertical angles with an absolute value of approximately 15° or more.

The illustrations are plotted in a polar coordinate system for the hemisphere, in which light is emitted. The straight lines in each case correspond to the horizontal and to the vertical. The transmission is in each case limited in particular in the horizontal direction. In the case of the shown circles, the polar angle from the inside (i.e., in the intersection of the straight line) to the outside is 25°, 45° and 90°.

It advantageously applies that the transition dipole moments are formed as one or several dichroitic dye(s), which are mixed with the liquid crystals in a guest-host arrangement. For permanent transition dipole moments, the liquid crystals can be fixed via a hardening process. The dichroitic dye molecules are generally aligned parallel to the liquid crystal molecules.

By means of the above-mentioned designs, it is additionally ensured that the first optical element 1 is set up non-periodically in its structure. This is highly advantageous because in combination with pixel structures of screens, there is no risk for artefacts, such as Moiré effects.

The first preferred direction can in each case draw an angle of between 0° and 45° to a surface normal of the first optical element 1. In addition, it is possible that the first preferred direction varies over the surface of the first optical element 1. In terms of the invention, the average, weighted preferred direction then applies.

Figure 2:
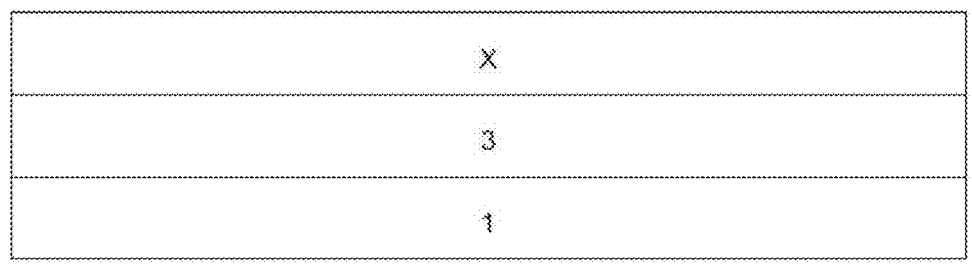
FIG. 2 shows the schematic diagram of an exemplary setup of a switchable light filter in a first design.

FIG. 2 further represents the schematic diagram of an exemplary setup of a switchable light filter 5 in a first design. The liquid crystal layer 3 is thereby arranged in front of the first optical element 1 in the viewing direction (from the top). This first design further comprises a first linear polarization filter (X) located in front of the liquid crystal layer 3 in the viewing direction, the preferred polarization transmission direction of which is preferably aligned parallel to an edge of the optical element 1, preferably of the lower edge.

Figure 3:
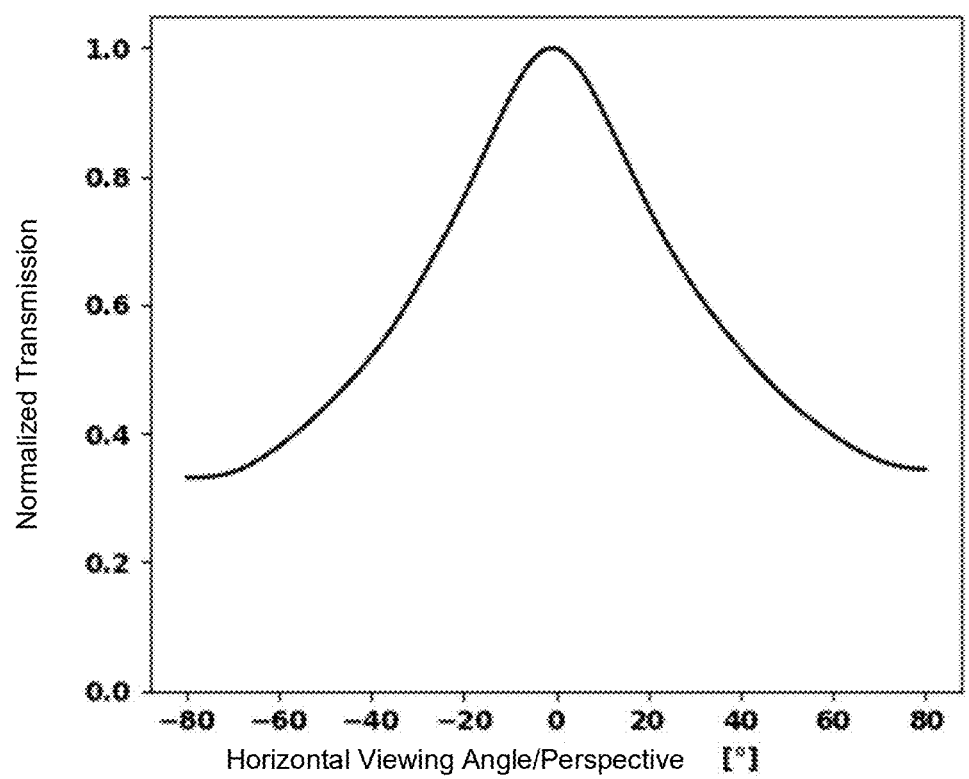
FIG. 3 shows an exemplary standardized transmission graph (schematic diagram based on a measurement) over the horizontal angular range for a switchable light filter in the first operating mode B1.

An exemplary standardized transmission graph (as schematic diagram based on a measurement) is illustrated in FIG. 3 over the horizontal angular range for a switchable light filter 5 in the first operating mode B1, in which the first electric field EF1 is applied. Due to the fact that $\alpha=0°$ was assumed, it applies here, as desired, that when light is incident at angles $\beta$ with $\alpha-60°\leq\beta\leq\alpha-40°$ or $\alpha+40°\leq\beta\leq\alpha+60°$ into the optical element 1 (and generally into the switchable light filter 5), the s-polarized proportion of said light is transmitted at at least one standardized transmission value $T_{B1}(\beta)\geq0.25$.

Figure 4:
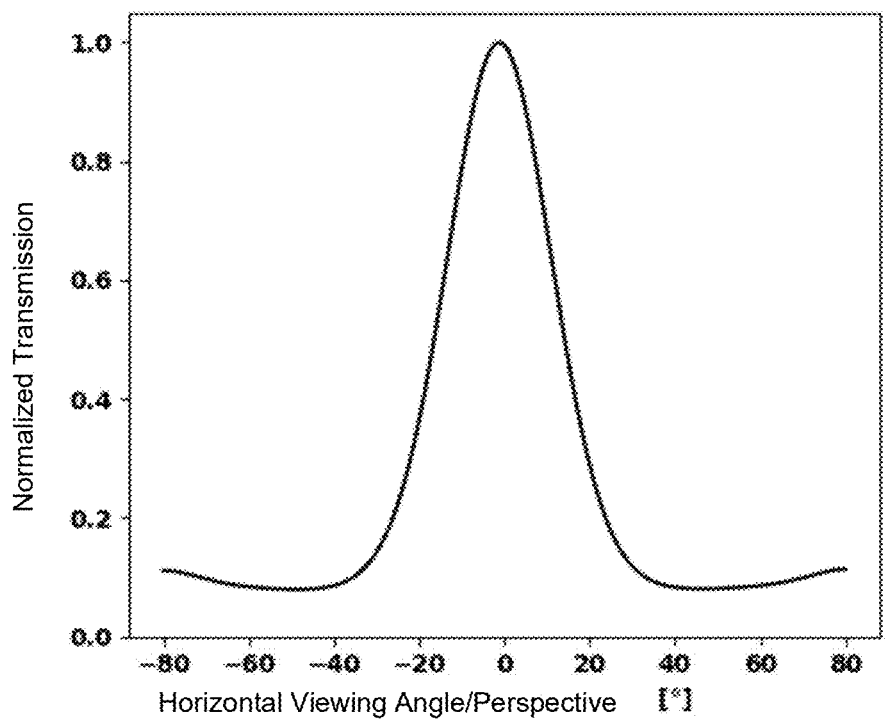
FIG. 4 shows an exemplary standardized transmission graph (schematic diagram based on a measurement) over the horizontal angular range for a switchable light filter in the second operating mode B2.

In contrast, FIG. 4 shows an exemplary standardized transmission graph (as schematic diagram based on a measurement) over the horizontal angular range for a switchable light filter 5 in the second operating mode B2, in which the second electric field EF2 is applied.

It can be seen here that when light is incident into the optical element 1 (or into the switchable filter 5, respectively), in angles $\beta$ with $\alpha-60°\leq\beta\leq\alpha-40°$ or $\alpha+40°\leq\beta\leq\alpha+60°$, in a second operating mode B2, in which the second electric field EF2 is applied, the p-polarized proportion of said light (the p-polarization originates in particular from the influence by the liquid crystal layer 3 here) is transmitted maximally at a standardized transmission value $T_{B2}(\beta)\leq0.2$ (in this case even $T_{B2}(\beta)\leq0.15$).

In certain designs of the invention, it can apply that there is at least one angle $\beta_1$, for which the transmission of the p-polarized proportion of said light is unequal to the transmission of the s-polarized proportion of said light. This condition preferably applies for an entire angular range of angles $\beta_1$, (e.g., of $-60°<\beta\leq-40°$ and or $+40°\leq\beta\leq+60°$ and particularly preferably even for all angles $\alpha\neq\beta$.

In yet other designs of the invention, it can apply that in both operating modes B1 and B2, there is at least one angle $\beta_2$, for which the transmission of the s-polarized proportion of said light is greater than the transmission of the p-polarized proportion of said light. This condition preferably applies for an entire angular range of angles $\beta_2$ (e.g., of $-60°\leq\beta\leq-40°$ and or $+40°\leq\beta<+60°$, and particularly preferably even for all angles $\alpha\neq\beta$.

Figure 5:
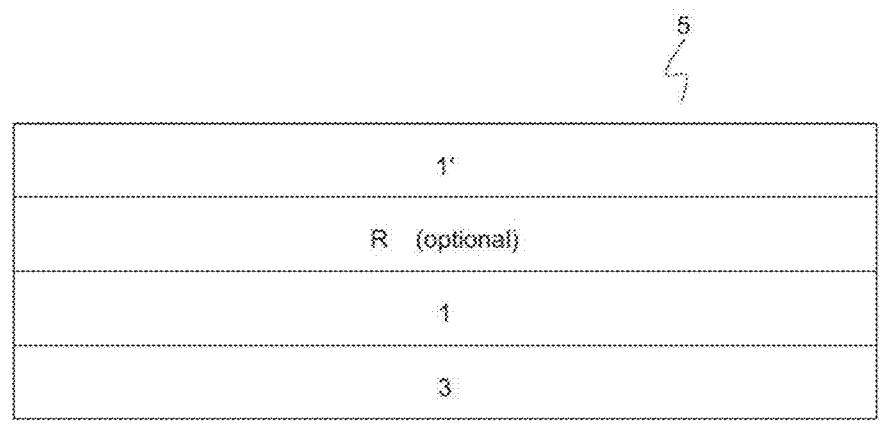
FIG. 5 shows the schematic diagram of an exemplary setup of a switchable light filter in a second design.

The schematic diagram of an exemplary setup of a switchable light filter is illustrated in FIG. 5 in a second design. The switchable light filter 5 thereby comprises at least two first optical elements 1, 1', wherein a retarder R is optionally arranged between at least two such first optical elements 1, 1'. In addition, the at least two first optical elements 1, 1' can, but do not have to, optionally have different thicknesses of the respective layers containing the plurality of light-absorbing transition dipole moments. For the case that the retarder R is arranged between the two first optical elements 1, 1', said retarder allows for an improved effect of the transmission limitation in particular in the second operating mode B2.

Figure 6:
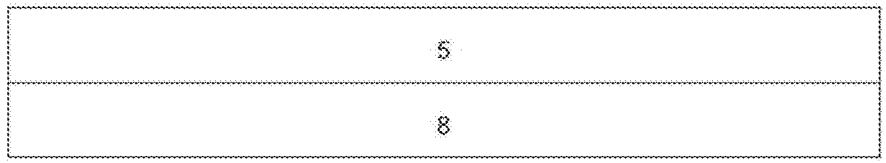
FIG. 6 shows the schematic diagram of an exemplary setup of a lighting device in a first design, comprising a switchable light filter.

The schematic diagram of an exemplary setup of a lighting device in a first design is shown in FIG. 6, comprising a switchable light filter 5. This lighting device in a first design, for a screen, which can be operated in at least two operating modes B1 for a free view mode and B2 for a limited view mode, in which light is emitted into a viewing angle region, which is limited for an observer compared to the free view mode, comprises a background lighting 8 extended in a flat manner, which emits light, and which is set up so as to shine directly (e.g., with an LED matrix, for local dimming), as well as a light filter 5 as described above, which is arranged in front of the background lighting 8 in the viewing direction.

In a first design, such a lighting device can thus also be operated in the two mentioned operating modes B1 and B2, when the switchable light filter 5 inserted therein is used accordingly in the respective operating mode.

Figure 7:
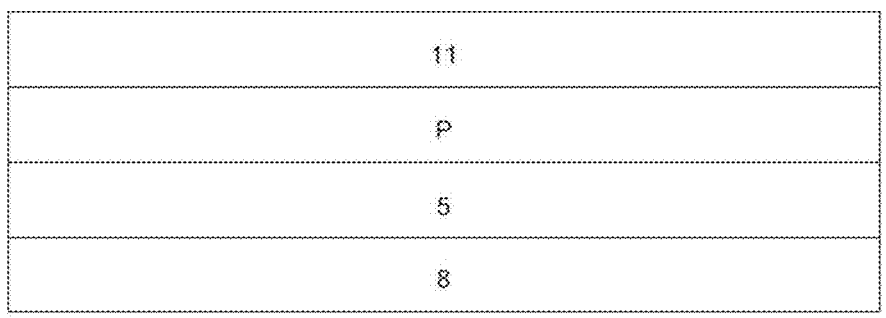
FIG. 7 shows the schematic diagram of an exemplary setup of a screen in a first design, which can be operated in at least two operating modes B1 and B2, comprising a switchable light filter.

FIG. 7 furthermore represents the schematic diagram of an exemplary setup of a screen in a first design, which can be operated in at least two operating modes B1 and B2, comprising a switchable light filter 5. Such a screen, which can be operated in at least two operating modes B1 for a free view mode and B2 for a limited view mode, in which light is emitted into a viewing angle region, which is limited for an observer compared to the free view mode, comprises, in a first design a lighting device, as described above with regard to FIG. 6, as well as, when no first linear polarization filter X is arranged in the switchable light filter 5 of the lighting device, a second linear polarization filter P, which is arranged in front of the background lighting 8 in the viewing direction, whereby light, which originates from the background lighting and penetrates the second linear polarization filter P, is limited in its propagation directions in combination with the optical element 1 of the switchable light filter 5, and a transmissive image reproduction device 11, which is arranged in front of the light filter 5 in the viewing direction, wherein in the operating mode B2 the second electric field Feld EF2 and wherein in the operating mode B1 the first electric field EF1 is applied.

It thereby preferably applies that the first or second linear polarization filter P, X is arranged in the transmissive image reproduction device 11 or is part thereof.

Figure 8:
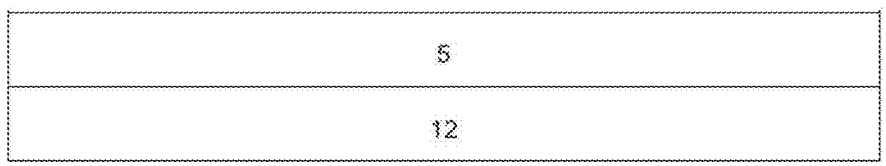
FIG. 8 shows the schematic diagram of an exemplary setup of a screen in a second design, which can be operated in at least two operating modes B1 and B2, comprising a switchable light filter.

The invention further comprises a screen in a second design, which can be operated in at least two operating modes B1 for a free view mode and B2 for a limited view mode, in which light is emitted into a viewing angle region, which is limited for an observer compared to the free view mode. For this purpose, FIG. 8 shows the schematic diagram of an exemplary setup of such a screen in a second design. The latter comprises an image reproduction device 12, wherein any type of image reproduction device is generally possible here, for example LC-panel, OLED, microLED and others, a light filter 5 as described above in front of the image reproduction device 12 viewed in the viewing direction, wherein in the operating mode B2 the second electric field EF2 and wherein in the operating mode B1 the first electric field EF1 is applied.

It can optionally apply thereby that the switchable light filter 5 is attached subsequently by a user and/or reversibly to the image reproduction device 12. A light filter 5 can be sold as so-called "after-market product" in this case.

Figure 9A:
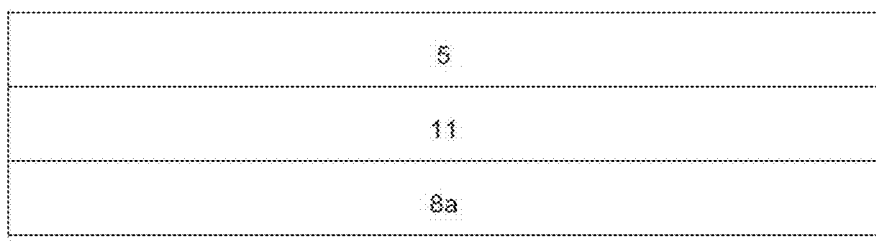
FIG. 9a shows the schematic diagram of an exemplary setup of a screen in a third design, which can be operated in at least two operating modes B1 and B2, comprising a switchable light filter.
Figure 9B:
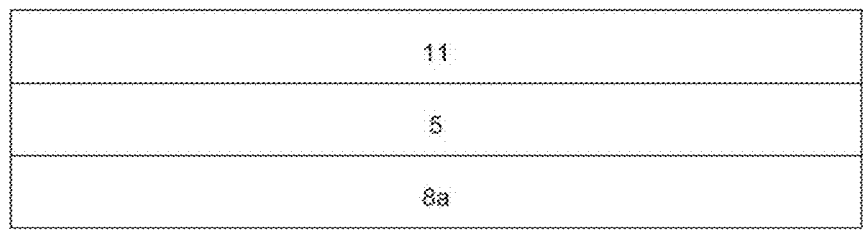
FIG. 9b shows the schematic diagram of an exemplary setup of a screen in a fourth design, which can be operated in at least two operating modes B1 and B2, comprising a switchable light filter.

FIG. 9a and FIG. 9b show the schematic diagrams of exemplary setups of a screen in a third and in a fourth design, which can be operated in at least two operating modes B1 and B2, comprising a switchable light filter. Such a screen comprises a transmissive image reproduction device 11, preferably an LC-panel, a background lighting 8a arranged downstream from the transmissive image reproduction device 11 in the viewing direction, wherein said background lighting 8a has a light density distribution, the peak brightness of which is emitted in a direction, which forms an angle of at least 3° with the first preferred direction, advantageously even 5° or 8° (the background lighting 8a can have a permanent or variable light density curve), a light filter 5 as described further above, in front of (see FIG. 9a, third design) or behind (see FIG. 9b, fourth design) of the image reproduction device 11 in the viewing direction, wherein in the operating mode B2 the second electric field EF2 and wherein in the operating mode B1 the first electric field EF1 is applied.

A background lighting 8a with such properties can be generated, for example, when it also contains a turning film and/or a partially mirrored or asymmetrical prism grid above a light guide with diffuser, BEF or DBEF, respectively.

Figure 9C:
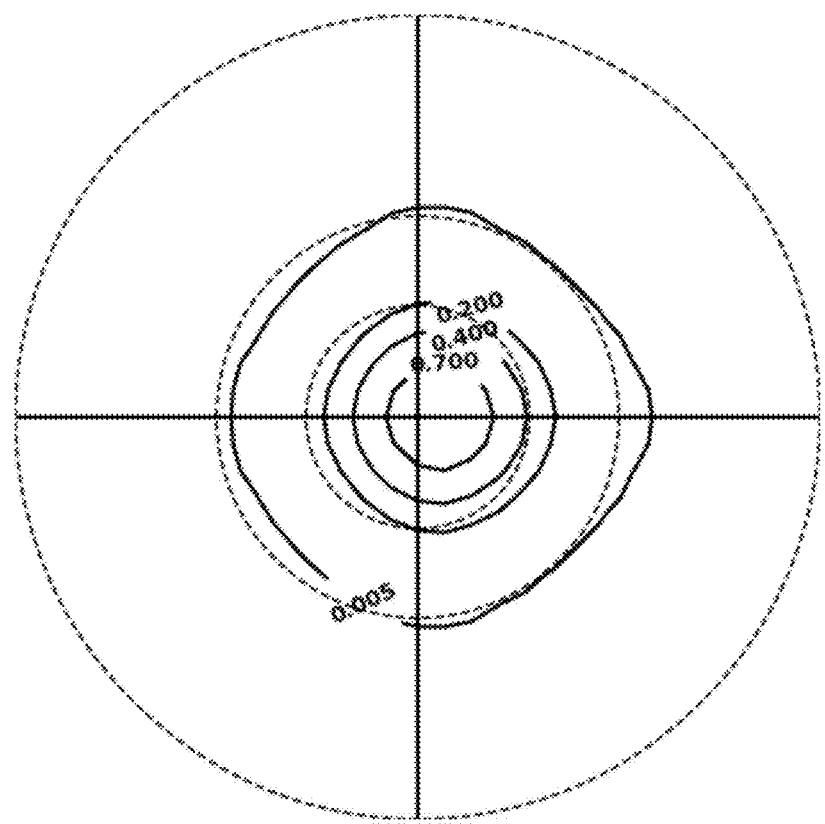
FIG. 9c shows an exemplary standardized light density distribution for a background lighting, as it can be used, for example, in a screen of the third or fourth design.
Figure 10A:
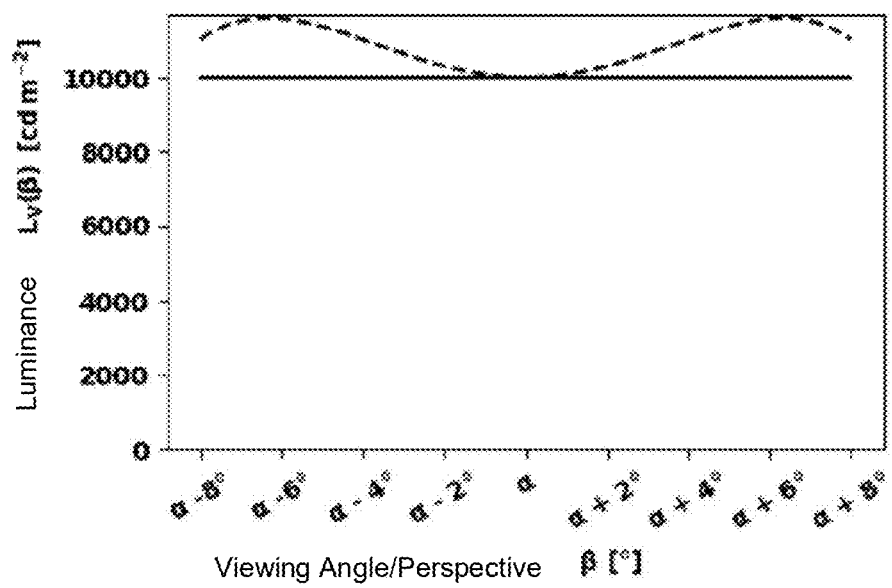
FIGS. 10a to 10d show exemplary light density or transmission graphs, respectively, with regard to in particular, but not exclusively, a screen of the third or fourth design.
Figure 10B:
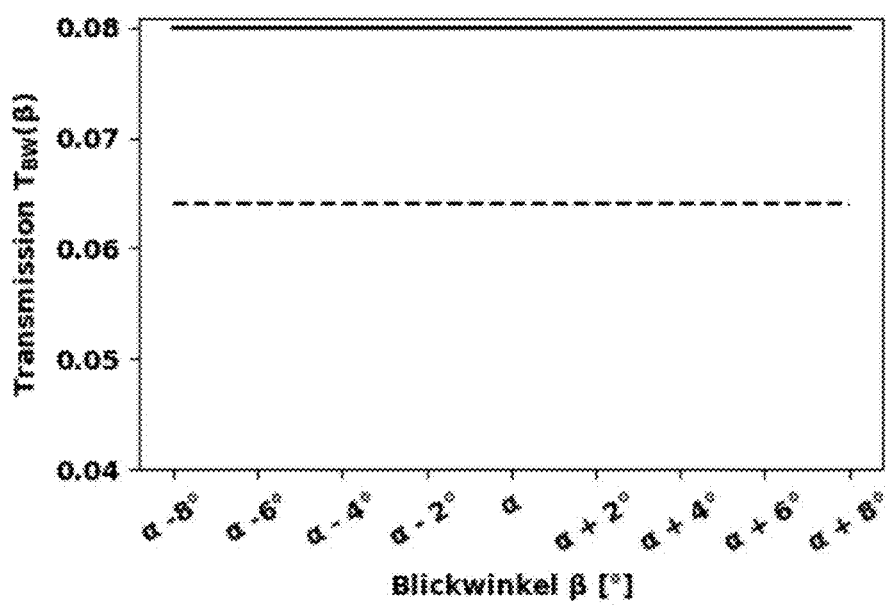
Figure 10C:
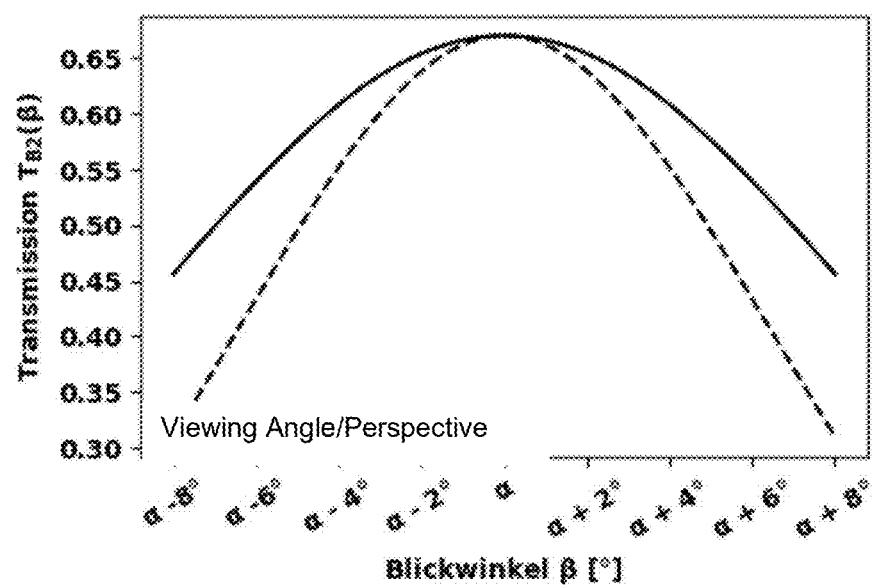
Figure 10D:
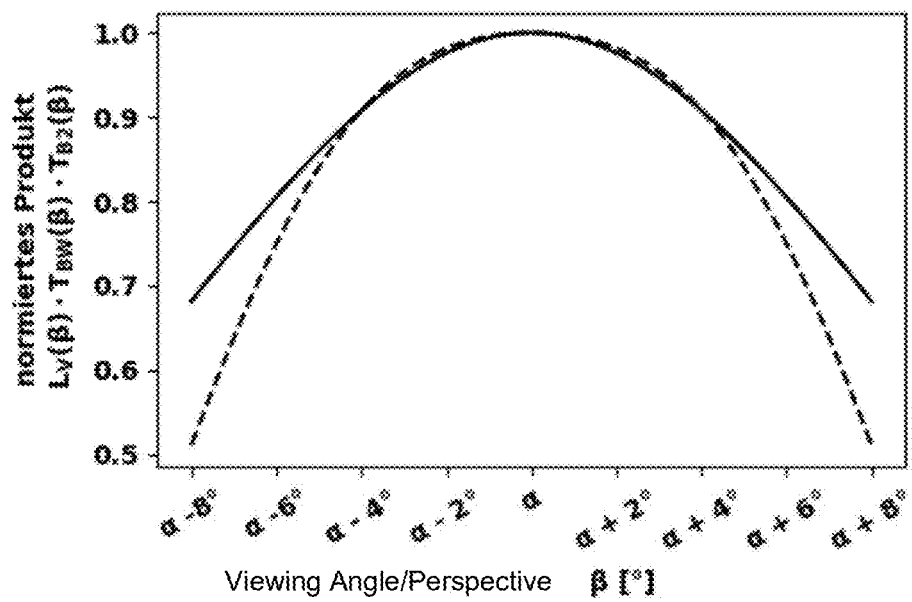

For this purpose, FIG. 9c shows an exemplary standardized light density distribution for a background lighting 8a, as it can be used, for example, in a screen of the third or fourth design: the peak brightness is shifted by approx. 5° to the right in the horizontal direction here.

For such a screen of the third or fourth design, it can furthermore advantageously apply, for at least one partial surface, that in the second operating mode B2 it applies for an angular range of at least $\alpha-4° \leq \beta \leq \alpha+4°$ (preferably even for $\alpha-6° \leq \beta \leq \alpha+6°$ or $\alpha-8° \leq \beta \leq \alpha+8°$, to maximally $\alpha-20° \leq \beta \leq \alpha+20°$), for all angles $\beta$ contained in said angular range that the product of $T_{B2}(\beta)$, light density $L_V(\beta)$ of the background lighting 8a at the angle $\beta$ as well as transmission $T_{BW}(\beta)$ of the image reproduction device 11 at the angle $\beta$ deviates maximally by +/−10% from the value for said product for the angle $\alpha=\beta$.

Due to the compliance of this product—as part of the mentioned tolerance—the perceived homogeneity is increased for an observer because, for instance in the case of a strong transmission decrease of the first optical element 1 or of the image reproduction device 11, respectively, when an oblique view is present, e.g., on lateral regions of the screen, when the observer looks centrally frontally onto the screen, is compensated again due to the correcting light density distribution of the background lighting 8a.

Reference shall be made in this context to the drawings FIG. 10a to FIG. 10d, which show exemplary light density or transmission graphs, respectively, of individual components or groups of components with regard to in particular, but not exclusively, a screen of the third or fourth design. Two different parameter combinations for the light density of the background lighting 8a, the transmission of the transmissive image reproduction device 11 and of the transmission of the optical element 1 are shown therein. The condition that the product of $T_{B2}(\beta)$, $L_V(\beta)$ and $T_{BW}(\beta)$ deviates by maximally 10% for angle $\beta$ with $\alpha-4 \leq \beta \leq \alpha+4°$ is fulfilled for both parameter sets. For the case, which is illustrated with the solid lines, light density $L_V(\beta)$ and transmission of the image reproduction device $T_{BW}(\beta)$ do not have an angular dependency.

For the second case (dashed lines), the angular dependency of $T_{B2}(\beta)$ is more pronounced, so that the condition can be met when only the light density $L_V(\beta)$ increases at least locally with the difference of the viewing angle $\beta$ from the angle xx.

Alternatively, it can optionally apply for such a screen of the third design—for at least a partial surface—that in the second operating mode B2 for an angular range of at least $\alpha-4° \leq \beta \leq \alpha+4°$, preferably even for $\alpha-6° \leq \beta \leq \alpha+6°$ or $\alpha-8° \leq \beta \leq \alpha+8°$, to maximally $\alpha-20° \leq \beta \leq \alpha+20°$, for all angles $\beta$ contained in said angular range that the product of $T_{B2}(\beta)$ and light density $L_V(\beta)$ of the background lighting 8a at the angle (deviates maximally +/−10% from the value for said product for the angle $\alpha=\beta$.

The above-described balancing effect also applies here due to the disruptive light density distribution of the background lighting, but by disregarding the transmission behavior $T_{BW}(\beta)$ of the image reproduction device 11.

Figure 11:
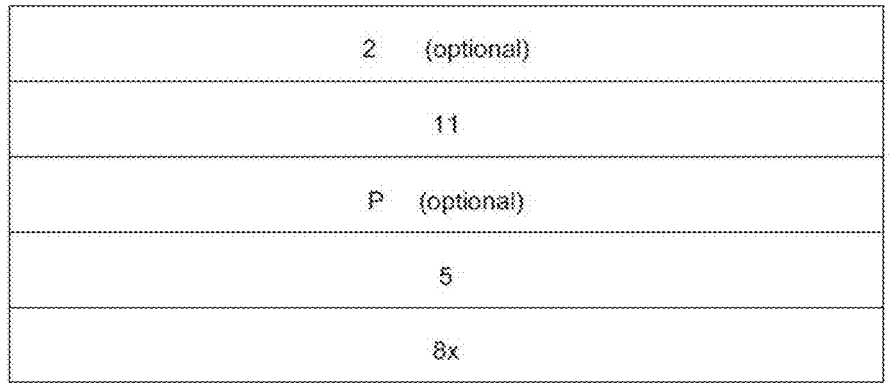
FIG. 11 shows the schematic diagram of an exemplary setup of a screen in a fifth design, which can be operated in at least two operating modes B1 and B2, comprising a switchable light filter.

Finally, the invention also comprises a screen in a fifth design, wherein the screen can be operated in at least two operating modes B1 for a free view mode and B2 for a limited view mode, in which light is emitted into an angular range, which is limited for an observer compared to the free view mode. For this purpose, FIG. 11 shows the schematic diagram of an exemplary setup of such a screen in a fifth alternative, comprising a transmissive image reproduction device 11, preferably an LC-panel, a background lighting 8x arranged downstream from the transmissive image reproduction device 11 in the viewing direction, wherein said background lighting 8x has an asymmetrical light density distribution, wherein said asymmetry is preferably present with respect to the horizontal direction from the point of view of an observer, a light filter 5, as described further above, in front of or behind the image reproduction device 11 in the viewing direction, as well as, when no first linear polarization filter X is arranged in the switchable light filter 5, a linear polarization filter P, which is arranged in front of the background lighting 8x in the viewing direction or in the image reproduction device 11, whereby light, which originates from the background lighting 8x and penetrates the second linear polarization filter P, is limited in its propagation directions in combination with the optical element 1 of the switchable light filter 5, wherein in the operating mode B2 the second electric field EF2 and wherein in the operating mode B1 the first electric field EF1 is applied.

The background lighting 8x is thereby designed so that it essentially does not have any symmetrical light density distribution (e.g., around the vertical central line—from the point of view of the observer) but, in contrast, embodies an asymmetrical light density distribution (e.g., in the horizontal). In other words: said background lighting 8a has an asymmetrical light density distribution auf, wherein said asymmetry is preferably present with respect to the horizontal direction from the point of view of the observer. Such a design is possible, for example, by using light guides, which decouple light in a deterministic manner and/or turning films, which shift the peak brightness.

This variation is advantageous for use cases in vehicles because in particular light, which would be emitted in the direction of the passenger window, can then be decreased significantly by the design of the background lighting, for instance starting at horizontal angles of 25 degrees or more (compared to the perpendicular bisector), for example to less than 20%—preferably to less than 2.5%—of the peak brightness, while an intentionally high light density is present in the direction of the driver. Disturbing reflections in the passenger window or optionally on the outside mirror closest to the passenger are reduced or even avoided in this way. Due to the switchable light filter 5 attached in front of the image reproduction device 11, the screen can nonetheless optionally be operated so that either only the passenger can see image contents (operating mode B2), for instance for moving images, or that driver as well as passenger can see image contents (operating mode B1), for instance for navigation map material.

For some above-described screens of the first to fifth design, it can be advantageous when being used in a passenger car when in the viewing direction in front of the transmissive image reproduction device 11, a second optical element 2 is arranged (see also FIG. 11), which comprises:

a plurality of light-absorbing transition dipole moments; the dye mass density is thereby greater than 1% or even greater than 10%, respectively.

wherein the majority of the transition dipole moments at least in a first state with a tolerance of maximally 20° (alternatively) 10° is aligned parallel to a second preferred direction, which can be selected for the second optical element 2, or fluctuates around it, wherein the second preferred direction is arranged at an angle $\alpha_1$ to the perpendicular bisector of the second optical element 2 (the following can apply thereby, for example, $\alpha_1 = 0°$, $\alpha_1 = +/-2°$ or amount) $(\alpha_1) > 2°$, wherein the angle $\alpha 1$ is measured in a selectable second plane, which contains said perpendicular bisector; the second plane 2 preferably lies perpendicular to the first plane of the first optical element 1, so that light, which is incident into the second optical element 2, is transmitted or at least partially absorbed as a function of its direction of incidence with respect to the second optical element 2 and its polarization state.

This last-mentioned design advantageously ensures a reduced transmission in the vertical direction and can thus reduce or even completely avoid reflections of image contents displayed on said screen on the windshield in the vehicle.

Figure 12:
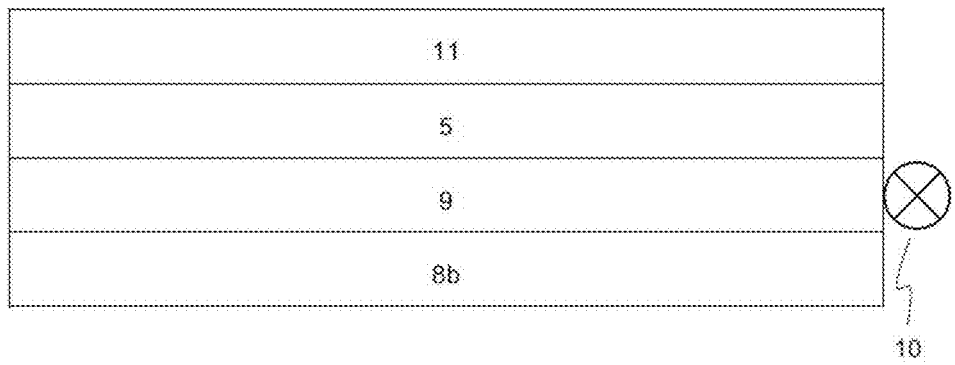
FIG. 12 shows the schematic diagram of an exemplary setup of a lighting device in a second design, comprising a switchable light filter, as well as FIG. 13 shows the schematic diagram of an exemplary setup of a lighting device in a third design, comprising a switchable light filter.

The invention further comprises a lighting device for a screen in a second design, which can be operated in at least two operating modes B1 for a free view mode and B2 for a limited view mode, in which light is emitted into an angular range, which is limited compared to the free view mode. For this purpose, FIG. 12 shows the schematic diagram of an exemplary setup of a lighting device in such a second design. It comprises a background lighting 8b extended in a flat manner, which emits light into a limited angular range and which is set up so as to optionally shine directly, as well as a plate-shaped light guide 9, which is located in front of the background lighting 8b in the viewing direction, which has decoupling elements on at least one of the large surfaces and/or within its volume, lighting means 10 arranged laterally on at least one narrow side of the light guide 9, and optionally a linear polarization filter P (not illustrated graphically), a light filter 5, as described further above, which is arranged in front of the background lighting 8b in the viewing direction (this also includes a position in front of a screen, with which the lighting device is used), wherein in the operating mode B2, the background lighting 8b is turned on and the lighting means 10 are turned off, and wherein in the operating mode B1 at least the lighting means 10 are turned on, and wherein in the operating mode B2 the second electric field EF2 and wherein in the operating mode B1 the first electric field EF1 is applied.

A transmissive image reproduction device 11, e.g., an LC-panel, is further also present here in the viewing direction (thus from the top in the sheet plane).

In the context of the invention and in particular with regard to the background lighting, "limited angular range" means that the corresponding light density is concentrated in a defined angular range at at least 80% or 90%, while there can in fact also still be residual light outside of the defined limited angular range, which generally has a technical reason. Ideally, such residual light is minimal and decreases towards larger angles. To attain a particularly strong minimization, a corresponding light filter is used in addition to the background lighting, which emits light into a limited angular range. This also applies for the below-described variation with a light guide, which emits or decouples light, respectively, mostly into a limited angular range. In contrast to this design of the invention, light density curves of background lighting are typically bell-shaped beyond in particular horizontal (optionally also vertical) angular ranges, wherein, however, no real concentration of the light density by a smaller angular range has to be present.

Figure 13:
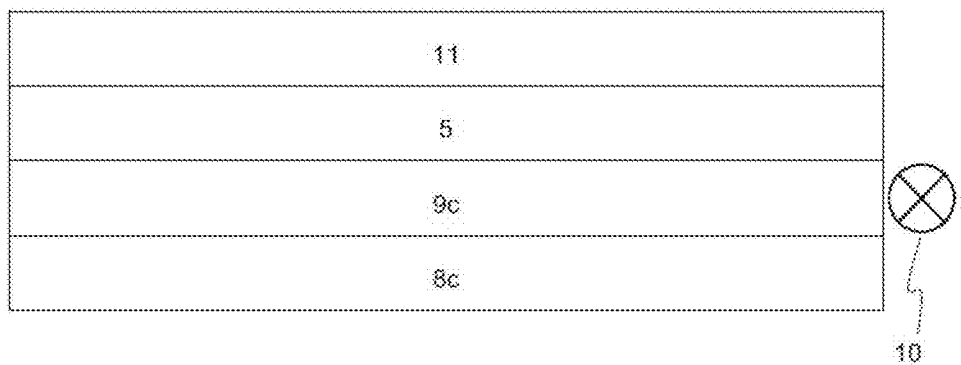

Lastly, the invention comprises a lighting device for a screen in a third design, which can be operated in at least two operating modes B1 for a free view mode and B2 for a limited view mode, in which light is emitted into an angular range, which is limited compared to the free view mode. For this purpose, FIG. 13 represents the schematic diagram of an exemplary setup of a lighting device in a third design. It comprises

- a background lighting 8c extended in a flat manner, which emits light into a non-limited angular range and which is set up so as to optionally shine directly (e.g., by means of a locally dimmable LED matrix lighting unit), as well as
- a plate-shaped light guide 9c, which is located in front of the background lighting 8c in the viewing direction, which has decoupling elements on at least one of the large surfaces and/or within its volume, wherein said decoupling elements mostly decouple light, which is coupled in laterally into at least one narrow side of the light guide 9c (i.e., at more than half, preferably at more than 80% or 90%) into a limited angular range,
- lighting means 10 arranged laterally on at least one narrow side of the light guide 9c, and
- optionally a linear polarization filter P (not illustrated graphically),
- a light filter 5 as described above, which is arranged in front of the background lighting 8c, preferably in front of the light guide 9c, in the viewing direction,
- wherein in the operating mode B2, the background lighting 8c is turned off and the lighting means 10 are turned on, and wherein in the operating mode B1 at least the background lighting 8c is turned on (the lighting means 10 can optionally also be turned on), and
- wherein in the operating mode B2 the second electric field EF2 and wherein in the operating mode B1 the first electric field EF1 is applied.

The lighting devices of the first, second and third designs are advantageously combined with a transmissive image reproduction device 11 (see, e.g., also FIG. 12 and FIG. 13), for instance an LC-panel, in order to create a screen, which can be operated in at least two operating modes B1 for a free view mode and B2 for a limited view mode, in which light is emitted into an angular range, which is limited compared to the free view mode.

The invention solves the posed object: a light filter comprising an optical element was described, in the case of which light, which is incident into the optical element, is transmitted as a function of its direction of incidence and its polarization properties—but not primarily as a function of its position—or is absorbed partially or completely. Due to the light filters, which use the optical element, the transmission of light is influenced as a function of the angle, optionally with regard to a sitting or standing observer, wherein a switchover between at least two operating states can be made. In particular the transmission behavior for certain directions can be switched over thereby.

The above-described invention can be used advantageously in combination with an image reproduction device wherever confidential data is displayed and/or input, such as, for instance, during the PIN input or for the data display on cash machines or payment terminals or for the password input or when reading emails on mobile devices. As described further above, the invention can also be used in a passenger car, in order to optionally keep disruptive image contents from the driver or passenger.

LIST OF REFERENCE NUMERALS 1 first optical element
2 second optical element
3 liquid crystal layer
5 switchable light filter
6 perpendicular bisector of the first optical element
8 background lighting
8a background lighting
8b background lighting
8c background lighting
8x background lighting
9, 9c light guide
10 lighting means
11 image reproduction device
12 s-polarized portion of light
13 p-polarized portion of light
14 p-polarized portion of light transmitted by switchable light filter 5
15 transition dipole moment aligned parallel to angle (x) of first preferred direction
16 first direction
P, X polarization filter
α angle (a) of first direction to perpendicular to bisector (16) of first optical element (1); transition dipole moment aligned parallel to first direction

The invention claimed is:

1. A switchable light filter (5), comprising
at least one first optical element (1) comprising
a plurality of light-absorbing transition dipole moments (15) formed by dichroitic dyes, in the case of which the dye mass fraction is more than 1%, arranged in a layer with a thickness of from 0.2 microns to 50 microns, including the limits,
wherein, in at least a first state, a majority of the plurality of light-absorbing transition dipole moments (15) is aligned with a tolerance of maximally 5° parallel to a first direction (16),
wherein the first direction that is selectable for the at least one first optical element (1), or the majority of the plurality of light-absorbing transition dipole moments (15) fluctuates with respect to the first direction (16),
wherein the first direction (16) is arranged at an angle α as measured against a perpendicular bisector (6) of the at least one first optical element (1), whereby the angle α is measured in a selectable first plane, containing the perpendicular|bisector (6),
so that light, incident into the at least one first optical element (1) and having a direction of incidence and a polarization state, is transmittable or at least partially absorbable as a function of the direction of incidence with respect to the at least one first optical element (1) and the polarization state,
a liquid crystal layer (3), which is arranged behind or in front of the at least one first optical element (1) in a viewing direction and onto which a first electric field (EF1) or a second electric field (EF2) is applied acts and which, as a function thereof, influences the polarization state of light passing through the liquid crystal layer (3),
wherein, when the liquid crystal layer (3) is arranged in front of the at least one first optical element (1) in the viewing direction, a first linear polarization filter (X), lies in front of the liquid crystal layer (3) in the viewing direction,
such that transmission properties of the switchable light filter (5) differ between a first operating mode B1, in which the first electric field (EF1) is applied, and a second operating mode B2, in which the second electric field (EF2) is applied with a field strength equal to 0 V/μm, wherein the respective relative transmission in the first and second operating modes B1 and B2 at one or more points on switchable light filter (5) except for a selectable tolerance up to 5% Is, in each case, described by a transmission $T_{B1}(\beta)$ for the first operating mode B1 or $T_{B2}(\beta)$ for the second operating mode B2, respectively, which are each standardized such that the following applies for the values of the transmission Tp1(α)=1 and Tg2(α)=1, in that, when light is incident into the at least one first optical element (1) at angles (8) with α−60°≤β≤α−40° or α+40°≤β≤α+60°, in the first operating mode B1, in which the first electric field (EF1) is applied, the s-polarized proportion of the light is transmitted by the switchable light filter (5) to a standardized transmission value $T_{B1}(\beta) \geq 20.25$, and is incident into the at least one first optical element (1) at angles (β) with α−60°≤β≤α−40° or α+40°≤β≤α+60°, in the second operating mode B2, in which the second electric field (EF2) is applied, the p-polarized proportion of the light (14) is transmitted by the switchable light filter (5) to maximally a standardized transmission value $T_{B2}(\beta) \leq 0.2$.

2. The switchable light filter (5) of claim 1, wherein at least one of the at least one first optical element (1) and the liquid crystal layer (3) is divided into several, separately switchable segments, such that a local switch-over capability between the respective possible operating modes is made possible.

3. The switchable light filter (5) of claim 1, wherein the switchable light filter (5) comprises at least two first optical elements (1, 1').

4. The switchable light filter (5) of claim 3, wherein a retarder is arranged between the two or more first optical elements (1, 1').

5. The switchable light filter (5) of claim 1, wherein there is at least one angle ($\beta_1$), for which the transmission of the p-polarized portion of the light is not equal to the transmission of the s-polarized portion of the light.

6. The switchable light filter (5) of claim 1, wherein, for both of the first and second operating modes B1 and B2, there is at least one angle ($\beta_2$), for which the transmission of the s-polarized proportion of the light is greater than the transmission of the p-polarized proportion of the light.

7. The switchable light filter (5) of claim 1, further comprising a retarder.

* * * * *

UNITED STATES PATENT AND TRADEMARK OFFICE
CERTIFICATE OF CORRECTION

PATENT NO. : 12,411,378 B2
APPLICATION NO. : 18/594894
DATED : September 9, 2025
INVENTOR(S) : André Heber et al.

It is certified that error appears in the above-identified patent and that said Letters Patent is hereby corrected as shown below:

In the Specification

Column 5, Line 50, "N/4" should read -- "$\lambda 4$" --.

Column 11, Line 38, "N/4" should read -- "$\lambda 4$" --.

Column 15, Line 19, "$T_{B1}(3)$" should read -- "$T_{B1}(ß)$" --.

Column 15, Line 26, "$T_{B2}(3)$" should read -- "$T_{B2}(ß)$" --.

Column 15, Line 31, "ox" should read -- "$\alpha$" --.

Column 17, Line 58, "ox≠0°" should read -- "$\alpha \neq 0°$" --.

Column 20, Line 46, "xx" should read -- "$\alpha$" --.

Column 25, Line 7, "Is" should read -- "is" --.

Column 25, Line 12, "$Tp_1(\alpha) = 1$ and $Tg2(\alpha)=1$," should read -- $T_{B1}(\alpha) =1$ and $T_{B2}(\alpha)=1$" --.

Signed and Sealed this
Third Day of February, 2026

John A. Squires
*Director of the United States Patent and Trademark Office*